US007885507B2

(12) United States Patent
Ogata et al.

(10) Patent No.: US 7,885,507 B2
(45) Date of Patent: Feb. 8, 2011

(54) IMAGE REPRODUCING APPARATUS AND METHOD

(75) Inventors: Satoshi Ogata, Kanagawa (JP); Hisashi Fukugawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 1232 days.

(21) Appl. No.: 11/492,202

(22) Filed: Jul. 25, 2006

(65) Prior Publication Data

US 2007/0036526 A1 Feb. 15, 2007

(30) Foreign Application Priority Data

Jul. 25, 2005 (JP) ............... 2005-214576
Jun. 13, 2006 (JP) ............... 2006-163330

(51) Int. Cl.
H04N 7/00 (2006.01)
H04N 5/91 (2006.01)
(52) U.S. Cl. ..................... 386/46; 386/125
(58) Field of Classification Search ............. 386/68, 386/46, 124, 125, 92, 52, 67
See application file for complete search history.

(56) References Cited

U.S. PATENT DOCUMENTS

| 6,311,012 B1 | 10/2001 | Cho et al. |
| 2003/0113096 A1 | 6/2003 | Taira et al. |
| 2007/0172210 A1 | 7/2007 | Hamada et al. |
| 2009/0022478 A1* | 1/2009 | Jung et al. ............... 386/95 |

FOREIGN PATENT DOCUMENTS

JP    2002-171472    6/2002
JP    2005-27337     1/2005
WO    WO 2004/098183 A1  11/2004

OTHER PUBLICATIONS

Chinese Office Action, w/ English translation thereof, issued in Chinese Patent Application No. CN 2006101090320 dated Aug. 21, 2009.

* cited by examiner

Primary Examiner—Robert Chevalier
(74) Attorney, Agent, or Firm—McDermott Will & Emery LLP

(57) ABSTRACT

An image reproducing apparatus for selectively reproducing and outputting image data of an arbitrary angle from image data of a plurality of angles including a plurality of reproduction units, comprising: an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information storage means which stores the angle change position information recorded in the reproduction units excluding a currently-reproduced reproduction unit at a currently-reproduced angle, wherein, if the angle position information determination section determines that the angle change cannot be performed by using the angle change position information recorded in the currently-reproduced reproduction unit, the control means changes the angle of the reproduced image data by using the angle change position information stored in the angle change position information storage means.

33 Claims, 25 Drawing Sheets

IMAGE REPRODUCING APPARATUS AND METHOD

BACKGROUND OF THE INVENTION

1. Field of the Invention

The present invention relates to image reproducing apparatus and method of selectively reproducing and outputting image data of an arbitrary angle from image data of a plurality of angles including a plurality of reproduction units.

2. Description of the Related Art

Conventionally, there has been commercially provided a multi-angle adaptive image reproducing apparatus of reproducing an optical disk on which images picked up at a plurality of camera angles are multiplexed and recorded as an angle block performed in the same time interval so that the image can be seen at a plurality of the angle. In a DVD-Video, one angle block can include a maximum of nine angle cells, and angle change is performed by shifting reproduced angle cells.

When the angle change is performed in a non-seamless manner, the angle cell is theoretically constructed with reproduction units VOBUs (Video OBject Units), and an address of the change destination VOBU of NSML_AGLI (non-seamless angle information) of an NV_PCK (Navigation Pack) recorded in the VOBU is acquired as angle change position information, thereby the angle change being performed. For example, in FIG. 15, when the angle change to an angle 1 is performed during reproduction of a VOBU 10 of an angle cell 2, an address of the change destination VOBU in the angle cell 1 of NSML_AGLI of an NV_PCK recorded in the VOBU 10 is acquired. If the address is a front end address of a VOBU 4, reproduction is performed from the VOBU 4. Similarly, when the angle change to an angle 3 is performed, an address of the change destination VOBU in the angle cell 3 of the NSML_AGLI of the NV_PCK recorded in the VOBU 10 is acquired, and the angle is changed to a front end of a VOBU 16.

When the angle change is performed in a seamless manner, the angle cell is constructed with ILVUs (InterLeaVed Units) including at least two VOBUs, and an address of the change destination ILVU of SML_AGLI (seamless angle information) of an NV_PCK (Navigation Pack) recorded in a VOBU of the ILVU is acquired as angle change position information, thereby the angle change being performed. For example, in FIG. 16, when the angle change to an angle 1 is performed during reproduction of an ILVU 10 of an angle cell 2, an address of the change destination ILVU in the angle cell 1 of SML_AGLI of an NV_PCK recorded in a VOBU of the ILVU 10 is acquired. If the address is a rear-end address of an ILVU 4, after the ILVU 10 is reproduced, the reproduction is performed from the ILVU 4. Similarly, when the angle change to an angle 3 is performed, an address of the change destination ILVU in the angle cell 3 of the SML_AGLI of the NV_PCK recorded in the ILVU 10 is acquired, and the angle is changed to a rear end of an ILVU 16.

In addition to the NSML_AGLI and the SML_AGLI, SML_PBI (seamless reproduction information) and VOBU_SRI (VOBU search information) are recorded in the NV_PCK. In the SML_PBI, ILVU_EA (rear-end address of an ILVU), NXT_ILVU_SA (start address of next ILVU), and NXT_ILVU_SZ (size of next ILVU) are recorded. In the VOBU_SRI, front end addresses of former and later VOBUs of the associated VOBU or front end addresses of VOBUs that are reproduced for 0.5xn seconds just-before and just-after the starting time point of the VOBU are recorded.

However, if the SML_AGLI recorded in the VOBU of the currently-reproduced ILVU at the time of angle change, the change destination address in the angle cell at the desired angle cannot be identified, so that the angle change cannot be performed. Therefore, there has been proposed an image reproducing apparatus for performing the angle change without delay by using the SML_AGLI recorded in the VOBU of the ILVU of another angle cell which is located in the same time interval as the currently-reproduced ILVU and multiplexed with the ILVU (for example, see Japanese Unexamined Patent Application Publication No. 2002-171472 (p3-p6, FIG. 1)).

However, in the aforementioned conventional image reproducing apparatus, if the SML_AGLI recorded in the VOBUs of the ILVU at all the angles cannot be acquired, the angle change may not be performed. In addition, in some cases, the change destination addresses of the angles at the ends of the angle cells are intentionally designated to 7FFFFFFFh. Like these cases, if the acquired change destination address is an unsuitable value, the angle change cannot be performed.

SUMMARY OF THE INVENTION

The present invention is contrived in order to solve the aforementioned problems, and an object of the present invention is to provided an image reproducing apparatus and method capable of performing angle change without stopping reproduction even in a case where angle change position information cannot be acquired from a currently-reproduced reproduction unit or a case where the angle change position information acquired from the currently-reproduced reproduction unit is an unsuitable value. Another object of the present invention is to provided an image reproducing apparatus and method capable of performing angle change without stopping reproduction even in a case where angle change position information cannot be acquired from a reproduction unit reproduced before switching to an angle menu or a case where the angle change position information acquired from the reproduction unit reproduced before switching to the angle menu is an unsuitable value.

According to an aspect of the present invention, there is provided an image reproducing apparatus for selectively reproducing and outputting image data of an arbitrary angle from image data of a plurality of angles including a plurality of reproduction units, comprising: an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information storage means which stores the angle change position information recorded in the reproduction units excluding a currently-reproduced reproduction unit at a currently-reproduced angle, wherein, if the angle position information determination section determines that the angle change cannot be performed by using the angle change position information recorded in the currently-reproduced reproduction unit, the control means changes the angle of the reproduced image data by using the angle change position information stored in the angle change position information storage means.

According to the aforementioned construction, even in a case where the angle change position information cannot be acquired from the currently-reproduced reproduction unit or a case where the angle change position information acquired from the currently-reproduced reproduction unit is an unsuitable value, it is possible to perform the angle change without stopping the reproduction by using the angle change position information stored in advance.

In the image reproducing apparatus according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to the aforementioned construction, it is possible to perform the reproduction after the angel change from a position close to the currently-reproduced reproduction unit.

According to an aspect of the present invention, there is provided an image reproducing apparatus for selectively reproducing and outputting image data of an arbitrary angle from image data of a plurality of angles including a plurality of reproduction units, comprising: an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information acquisition means which acquires the angle change position information recorded in the reproduction units excluding a currently-reproduced reproduction unit at a currently-reproduced angle, wherein, if the angle position information determination section determines that the angle change cannot be performed by using the angle change position information recorded in the currently-reproduced reproduction unit, the control means changes the angle of the reproduced image data by using the angle change position information acquired by the angle change position information acquisition means.

According to the aforementioned construction, even in a case where the angle change position information cannot be acquired from the currently-reproduced reproduction unit or a case where the angle change position information acquired from the currently-reproduced reproduction unit is an unsuitable value, it is possible to perform the angle change without stopping the reproduction by using the angle change position information recorded in the reproduction units excluding the currently-reproduced reproduction unit at a currently-reproduced angle.

In the image reproducing apparatus according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to the aforementioned construction, it is possible to perform the reproduction after the angel change from a position close to the currently-reproduced reproduction unit.

According to another aspect of the present invention, there is provided an image reproducing apparatus for selectively reproducing and outputting image data of an arbitrary angle from image data of a plurality of angles including a plurality of reproduction units, comprising: an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information storage means which stores the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the control means changes the angle of the reproduced image data by using the angle change position information stored in the angle change position information storage means.

According to the aforementioned construction, even in a case where angle change position information cannot be acquired from a reproduction unit reproduced before switching to an angle menu or a case where the angle change position information acquired from the reproduction unit reproduced before switching to the angle menu is an unsuitable value, it is possible to perform the angle change without stopping the reproduction by using the angle change position information stored in advance.

In the image reproducing apparatus according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to the aforementioned construction, it is possible to perform the reproduction after the angel change from a position close to the reproduction unit reproduced before switching to the angle menu.

According to another aspect of the present invention, there is provided an image reproducing apparatus for selectively reproducing and outputting image data of an arbitrary angle from image data of a plurality of angles including a plurality of reproduction units, comprising: an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information acquisition means which acquires the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the control means changes the angle of the reproduced image data by using the angle change position information acquired by the angle change position information acquisition means.

According to the aforementioned construction, even in a case where angle change position information cannot be acquired from a reproduction unit reproduced before switching to an angle menu or a case where the angle change position information acquired from the reproduction unit reproduced before switching to the angle menu is an unsuitable value, it is possible to perform the angle change without stopping the reproduction by using the angle change position information acquired from the reproduction unit reproduced before switching to the angle menu.

In the image reproducing apparatus according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to the aforementioned construction, it is possible to perform the reproduction after the angel change from a position close to the reproduction unit reproduced before switching to the angle menu.

In the image reproducing apparatus according to the aforementioned aspect of the present invention, if angle change position information representing an address of an angle change destination cannot be acquired or if the acquired address is 7FFFFFFFh, the angle position information determination section determines that the angle change cannot be performed.

In the image reproducing apparatus according to the aforementioned aspect of the present invention, the reproduced image data and the angle change position information are data in accordance with a DVD-Video standard.

According to another aspect of the present invention, there is provided an integrated circuit of an image reproducing apparatus for selectively reproducing and outputting image data of an arbitrary angle from image data of a plurality of angles including a plurality of reproduction units, the integrated circuit comprising: reproduction means which decodes input reproduction data into image data and sound data and outputs the image data and the sound data; an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information storage means which stores the angle change position information recorded in the reproduction units excluding a currently-reproduced reproduction unit at a currently-reproduced angle, wherein, if the angle position information determination section determines that the angle change cannot be performed by using the angle change position information recorded in the currently-reproduced reproduction unit, the control means changes the angle of the reproduced image data by using the angle change position information stored in the angle change position information storage means.

In the integrated circuit according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to another aspect of the present invention, there is provided an integrated circuit of an image reproducing apparatus for selectively reproducing and outputting image data of an arbitrary angle from image data of a plurality of angles including a plurality of reproduction units, the integrated circuit comprising: reproduction means which decodes input reproduction data into image data and sound data and outputs the image data and the sound data; an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information acquisition means which acquires the angle change position information recorded in the reproduction units excluding a currently-reproduced reproduction unit at a currently-reproduced angle, wherein, if the angle position information determination section determines that the angle change cannot be performed by using the angle change position information recorded in the currently-reproduced reproduction unit, the control means changes the angle of the reproduced image data by using the angle change position information acquired by the angle change position information acquisition means.

In the integrated circuit according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to another aspect of the present invention, there is provided an integrated circuit of an image reproducing apparatus for selectively reproducing and outputting image data of an arbitrary angle from image data of a plurality of angles including a plurality of reproduction units, the integrated circuit comprising: reproduction means which decodes input reproduction data into image data and sound data and outputs the image data and the sound data; an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information storage means which stores the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the control means changes the angle of the reproduced image data by using the angle change position information stored in the angle change position information storage means.

In the integrated circuit according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

According to another aspect of the present invention, there is provided an integrated circuit of an image reproducing apparatus for selectively reproducing and outputting image data of an arbitrary angle from image data of a plurality of angles including a plurality of reproduction units, the integrated circuit comprising: reproduction means which decodes input reproduction data into image data and sound data and outputs the image data and the sound data; an angle position information determination section which determines whether or not angle change is available based on angle change position information representing an address of an angle change destination recorded in the reproduction units; control means which changes an angle of a reproduced image data by using the angle change position information representing the address of the angle change destination recorded in the reproduction units; and angle change position information acquisition means which acquires the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the control means changes the angle of the reproduced image data by using the angle change position information acquired by the angle change position information acquisition means.

In the integrated circuit according to the aforementioned aspect of the present invention, the control means comprise reproduction position information acquisition means which acquires reproduction position information at the current reproduction time at the angle of change destination from the reproduction units represented by used angle change position information, and the control means changes the angle of the reproduced image data based on the acquired reproduction position information.

In the integrated circuit according to the aforementioned aspect of the present invention, if angle change position information representing an address of an angle change destination cannot be acquired or if the acquired address is 7FFFFFFFh, the angle position information determination section determines that the angle change cannot be performed.

In the integrated circuit according to the aforementioned aspect of the present invention, the reproduced image data and the angle change position information are data in accordance with a DVD-Video standard.

According to another aspect of the present invention, there is provided an image reproducing method of selectively reproducing and outputting image data of an arbitrary angle from image data of a plurality of angles including a plurality of reproduction units, comprising: an angle position information determination step of determining whether or not angle change is available based on angle change position information representing an address of an angle change destination recorded in the reproduction units; an angle change position information storage step of storing the angle change position information representing the address of the angle change destination recorded in the reproduction units excluding a currently-reproduced reproduction unit at a currently-reproduced angle; and a control step of, if in the angle position information determination step it is determined that the angle change cannot be performed by using the angle change position information recorded in the currently-reproduced reproduction unit, changing the angle of the reproduced image data by using the angle change position information stored in the angle change position information storage step.

In the image reproducing method according to the aforementioned aspect of the present invention, the control step comprises a reproduction position information acquisition step of acquiring reproduction position information at the current reproduction time at the angle of change destination from the reproduction units represented by used angle change position information, and in the control step, the angle of the reproduced image data based on the acquired reproduction position information is changed.

According to another aspect of the present invention, there is provided an image reproducing method of selectively reproducing and outputting image data of an arbitrary angle from image data of a plurality of angles including a plurality of reproduction units, comprising: an angle position information determination step of determining whether or not angle change is available based on angle change position information representing an address of an angle change destination recorded in the reproduction units; an angle change position information acquisition step of acquiring the angle change position information representing the address of the angle change destination recorded in the reproduction units excluding a currently-reproduced reproduction unit at a currently-reproduced angle; and a control step of, if in the angle position information determination step it is determined that the angle change cannot be performed by using the angle change position information recorded in the currently-reproduced reproduction unit, changing the angle of the reproduced image data by using the angle change position information acquired in the angle change position information acquisition step.

In the image reproducing method according to the aforementioned aspect of the present invention, the control step comprises a reproduction position information acquisition step of acquiring reproduction position information at the current reproduction time at the angle of change destination from the reproduction units represented by used angle change position information, and in the control step, the angle of the reproduced image data based on the acquired reproduction position information is changed.

According to another aspect of the present invention, there is provided an image reproducing method of selectively reproducing and outputting image data of an arbitrary angle from image data of a plurality of angles including a plurality of reproduction units, comprising: an angle position information determination step of determining whether or not angle change is available based on angle change position information representing an address of an angle change destination recorded in the reproduction units; angle change position information storage step of storing the angle change position information representing an address of an angle change destination recorded in the reproduction units excluding a reproduced reproduction unit at an angle reproduced before switching to an angle menu, a control step of, when reproduction restoring is performed from the angle menu by using a menu resume function, if in the angle position information determination step it is determined that the angle change cannot be performed by using the angle change position information recorded in the currently-reproduced reproduction unit, changing the angle of the reproduced image data by using the angle change position information stored in the angle change position information storage step.

In the image reproducing method according to the aforementioned aspect of the present invention, the control step comprises a reproduction position information acquisition step of acquiring reproduction position information at the current reproduction time at the angle of change destination from the reproduction units represented by used angle change position information, and in the control step, the angle of the reproduced image data based on the acquired reproduction position information is changed.

According to another aspect of the present invention, there is provided an image reproducing method of selectively reproducing and outputting image data of an arbitrary angle from image data of a plurality of angles including a plurality of reproduction units, comprising: an angle position information determination step of determining whether or not angle change is available based on angle change position information representing an address of an angle change destination recorded in the reproduction units; angle change position information acquisition step of acquiring the angle change position information representing an address of an angle change destination recorded in the reproduction units excluding a reproduced reproduction unit at an angle reproduced before switching to an angle menu, a control step of, when reproduction restoring is performed from the angle menu by using a menu resume function, if in the angle position information determination step it is determined that the angle change cannot be performed by using the angle change position information recorded in the currently-reproduced reproduction unit, changing the angle of the reproduced image data by using the angle change position information acquired in the angle change position information acquisition step.

In the image reproducing method according to the aforementioned aspect of the present invention, the control step comprises a reproduction position information acquisition step of acquiring reproduction position information at the current reproduction time at the angle of change destination from the reproduction units represented by used angle change position information, and in the control step, the angle of the reproduced image data based on the acquired reproduction position information is changed.

In the image reproducing method according to the aforementioned aspect of the present invention, if angle change position information representing an address of an angle change destination cannot be acquired or if the acquired address is 7FFFFFFFh, in the angle position information determination step, it is determined that the angle change cannot be performed.

In the image reproducing method according to the aforementioned aspect of the present invention, the reproduced image data and the angle change position information are data in accordance with a DVD-Video standard.

According to another aspect of the present invention, there is provided an image reproducing program for selectively reproducing and outputting image data of an arbitrary angle from image data of a plurality of angles including a plurality of reproduction units, the image reproducing program allowing a computer to function as the means included in the image reproducing apparatus according to the aforementioned aspects of the present invention. According to another aspect of the present invention, there is provided a computer readable recording medium on which the image reproducing program according to the aforementioned image reproducing program is recorded.

According to the preset invention, even in a case where angle change position information cannot be acquired from a currently-reproduced reproduction unit or a case where the angle change position information acquired from the currently-reproduced reproduction unit is an unsuitable value, it is possible to perform angle change without stopping reproduction by using angle change position information stored in advance.

DESCRIPTION OF THE PREFERRED EMBODIMENTS

Figure 1:
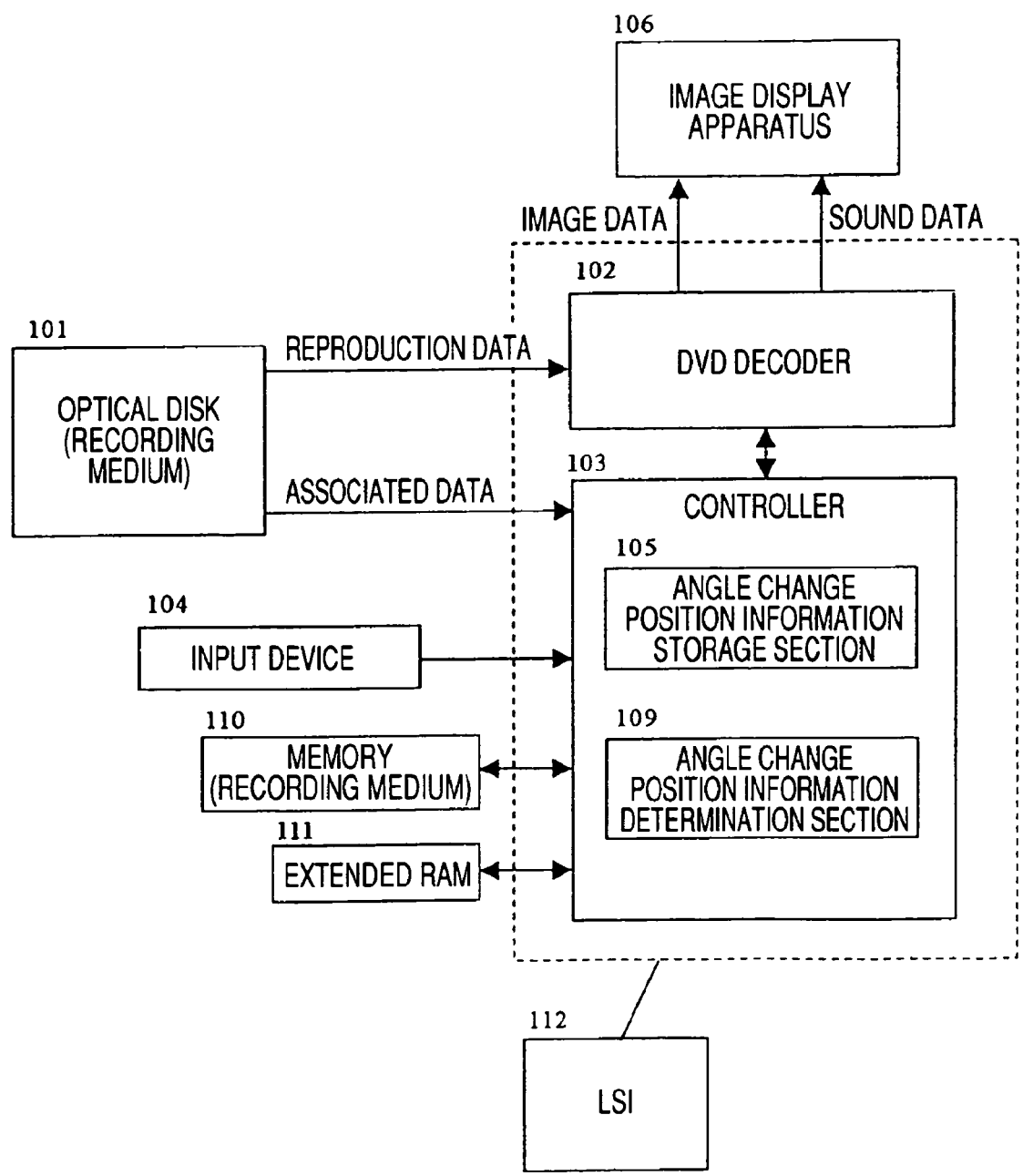
FIG. 1 is a schematic view showing a construction of an image reproducing apparatus according to a first embodiment of the present invention.

Hereinafter, image reproducing apparatuses according to embodiments of the present invention will be described in detail with reference to the accompanying drawings. In the description of the embodiments, elements having like functions are denoted by like reference numerals, and description thereof is omitted.

First Embodiment

FIG. 1 is a schematic view showing a construction of an image reproducing apparatus according to a first embodiment of the present invention. The image reproducing apparatus mainly includes a recording medium 101, a DVD decoder 102, a controller 103, an input device 104, a memory 110, a RAM 111, and the like. In the embodiment, an optical disk such as DVD is used as a recording medium.

Presentation data including image data and sound data and navigation data (NV_PCK) including reproduction control data and attribute data of the presentation data are compressed and recorded as a bitstream in the optical disk 101 as a recording medium.

The DVD decoder 102 decodes the input presentation data as image data and sound data and outputs image signals and sound signals under the control of the later-described controller 103.

The controller 103 performs reproduction control based on the navigation data acquired from the recording medium 101 or control over the whole apparatus. In addition, the controller 103 includes an angle change position information storage section 105 which stores angle change position information and an angle position information determination section 109 which determines based on the angle change position information whether or not angle change is available.

The input device 104 is constructed with a plurality of keys or a remote controller with which a user inputs control commands to the controller 103.

The image display apparatus 106 is constructed with such a display for outputting an image signal or a sound signal.

Figure 2:
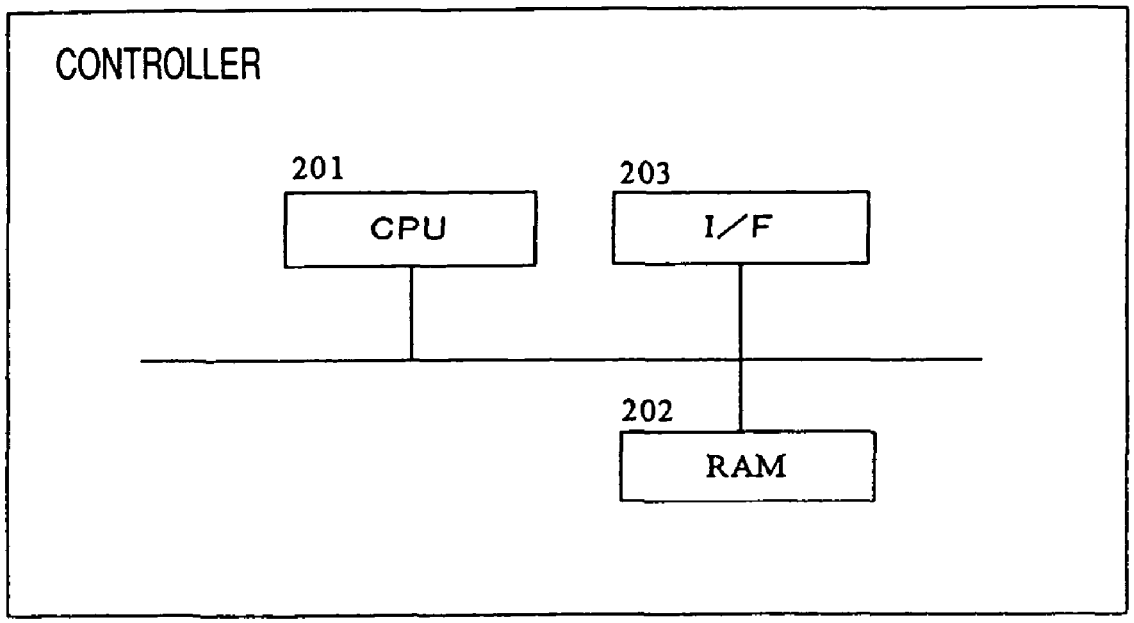
FIG. 2 is a schematic view showing a physical construction of a controller of the image reproducing apparatus according to the first embodiment of the present invention.

FIG. 2 is a schematic view showing a physical construction of a controller 103 of the image reproducing apparatus according to the first embodiment of the present invention. The controller 103 mainly includes a CPU 201, a RAM 202, an I/F 203, and the like. The I/F 203 transmits data to or receives data from an optical disk 101, a DVD decoder 102, an input device 104, a memory 110, an extended RAM 111, or the like. Functions of the angle change position information storage section 105 is implemented by allowing the CPU 201 embedded in the controller 103 to read out program codes stored in the memory 110 and execute the program codes. Alternatively, the present invention may be implemented by providing a recording medium on which program codes of software for implementing functions are recorded to a system or an apparatus and allowing the CPU of the provided system or apparatus to read out the program stored in the recording medium and to execute the program.

A non-volatile memory, a ROM, a hard disk, an optical disk, a CD-ROM, a CD-R, floppy disk, or the like may be used as the memory 110. In addition, in order to extend or modify functions, the program codes may be partially or entirely rewritten. Instead of the optical disk 101, a version-up disk on which the program does for implementing functions of the present invention are recorded may be used. The program codes read out from the version-up disk are stored in the memory 110.

The extended RAM 111 is used to store so large amount of data that the DVD decoder 102 and the controller 103 cannot store the data in the RAM 202.

In the image reproducing apparatus having the aforementioned construction, the reproduction of images and sounds from the optical disk is performed as follows. Firstly, a case of non-seamless angle change is described.

In general, when a cell of scene is reproduced, in order to continuously reproduce VOBU, the DVD decoder 102 decodes presentation data recorded in a present-time reproduced VOBU, and the controller 103 acquires NV_PCK recorded in the VOBU and performs reproduction control.

Figure 17:
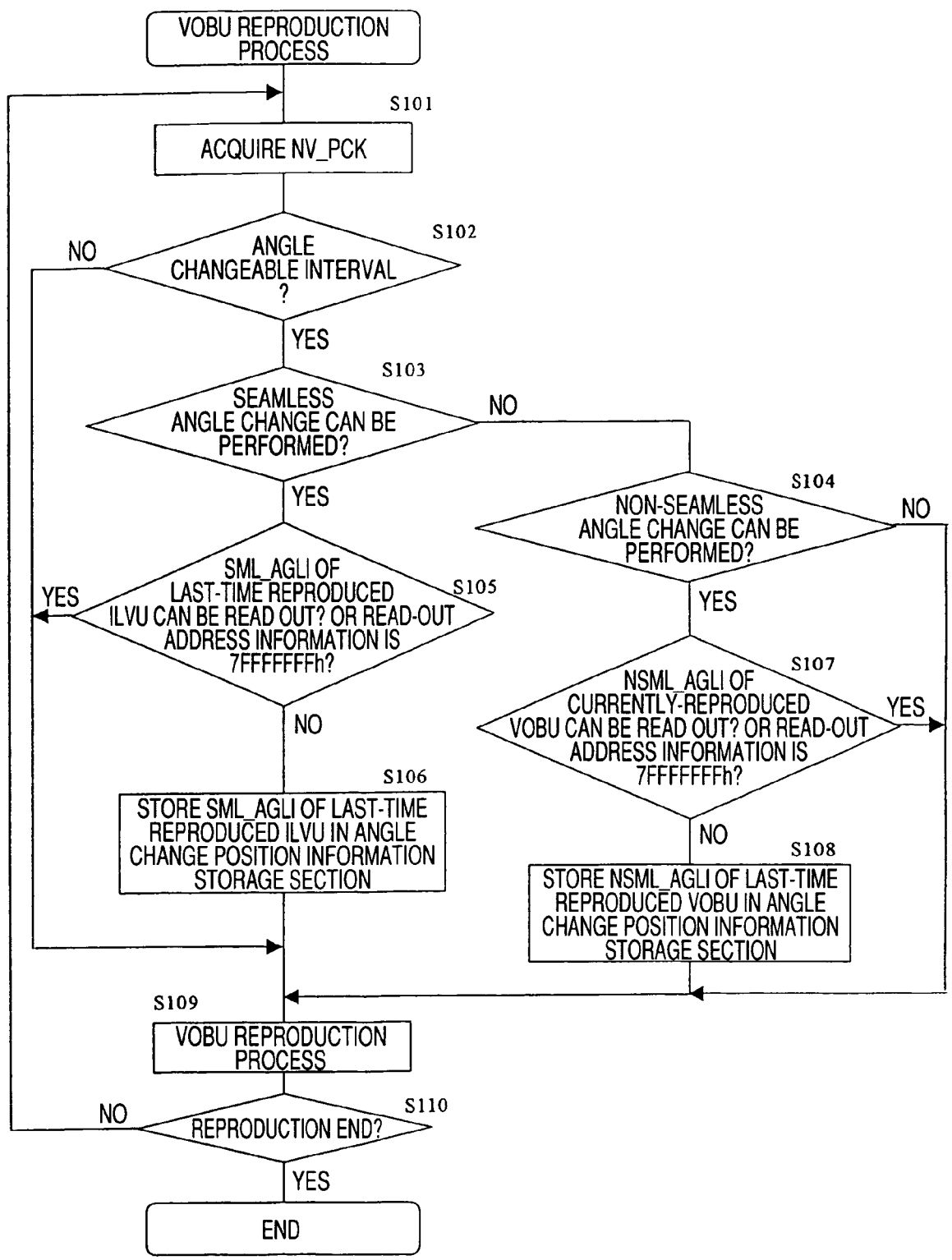
FIG. 17 is a view for explaining VOBU reproduction.

During reproduction of an angle scene, that is, an angle cell, the controller 103 acquires the present-time reproduced NV_PCK in Step S101 of a flowchart of a VOBU reproduction process of FIG. 17, checks a non-seamless angle changeable interval in Step S102 and Step S104, and stores NSML_AGLI recorded in an NV_PCK of in a last-time reproduced VOBU in an angle change position information storage section 105 in Step S108. In Step S107, when the angle position information determination section 109 determines that the NSML_AGLI in the last-time reproduced VOBU cannot be read out or that the read-out NSML_AGLI is explicitly an unsuitable address value such as 7FFFFFFFh, the storing thereof is not performed (Step S107: Y), so that NSML_AGLI in a before-last-time reproduced VOBU is maintained. Next, the controller 103 performs a VOBU reproduction process based on the angle change position information (Step S109), and until the reproduction ends (Step S110: Y), repeats the processes following Step S101 (Step S110: N). In addition, in Step S102 and S103, an seamless angle changeable interval is checked, and in Step S106, SML_AGLI in the last-time reproduced ILVU is stored in the angle change position information storage section 105. Next, the controller 103 performs the processes following the Step S109.

Figure 15:
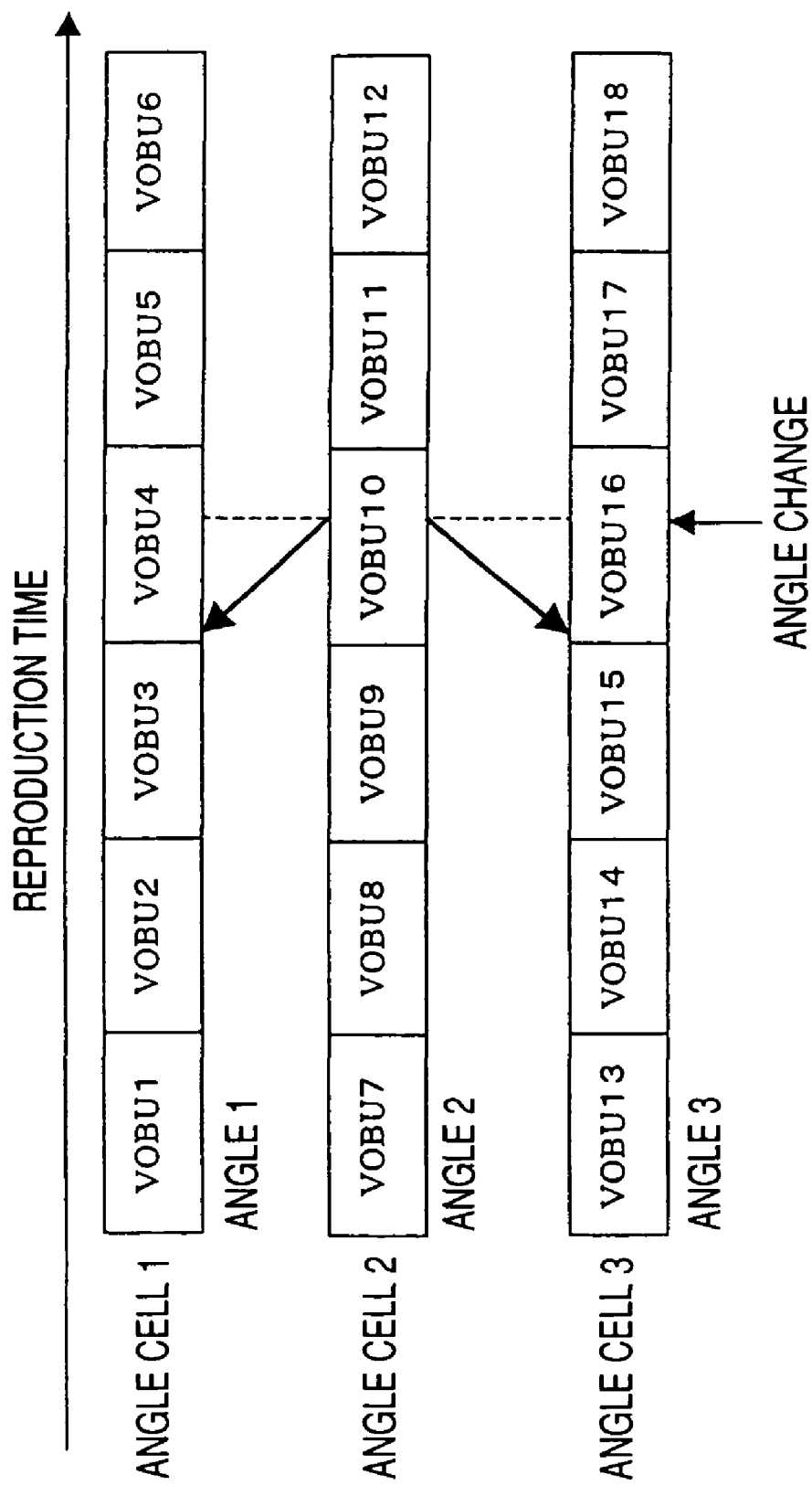
FIG. 15 is a view for explaining non-seamless angle change.

For example, in FIG. 15, if a VOBU 10 of a current angle cell 2 is in a currently-reproduced state, the controller 103 acquires an NV_PCK of the VOBU 10 and stores NSML_AGLI recorded in an NV_PCK of a VOBU 9 in the angle change position information storage section 105. However, when the angle position information determination section 109 determines that the NSML_AGLI in the VOBU 9 cannot be read out or that the read-out NSML_AGLI is an unsuitable address value, the NSML_AGLI in the VOBU 9 is not stored, so that NSML_AGLI in a before-last-time reproduced VOBU 8 is stored in the angle change position information storage section 105.

Figure 18:
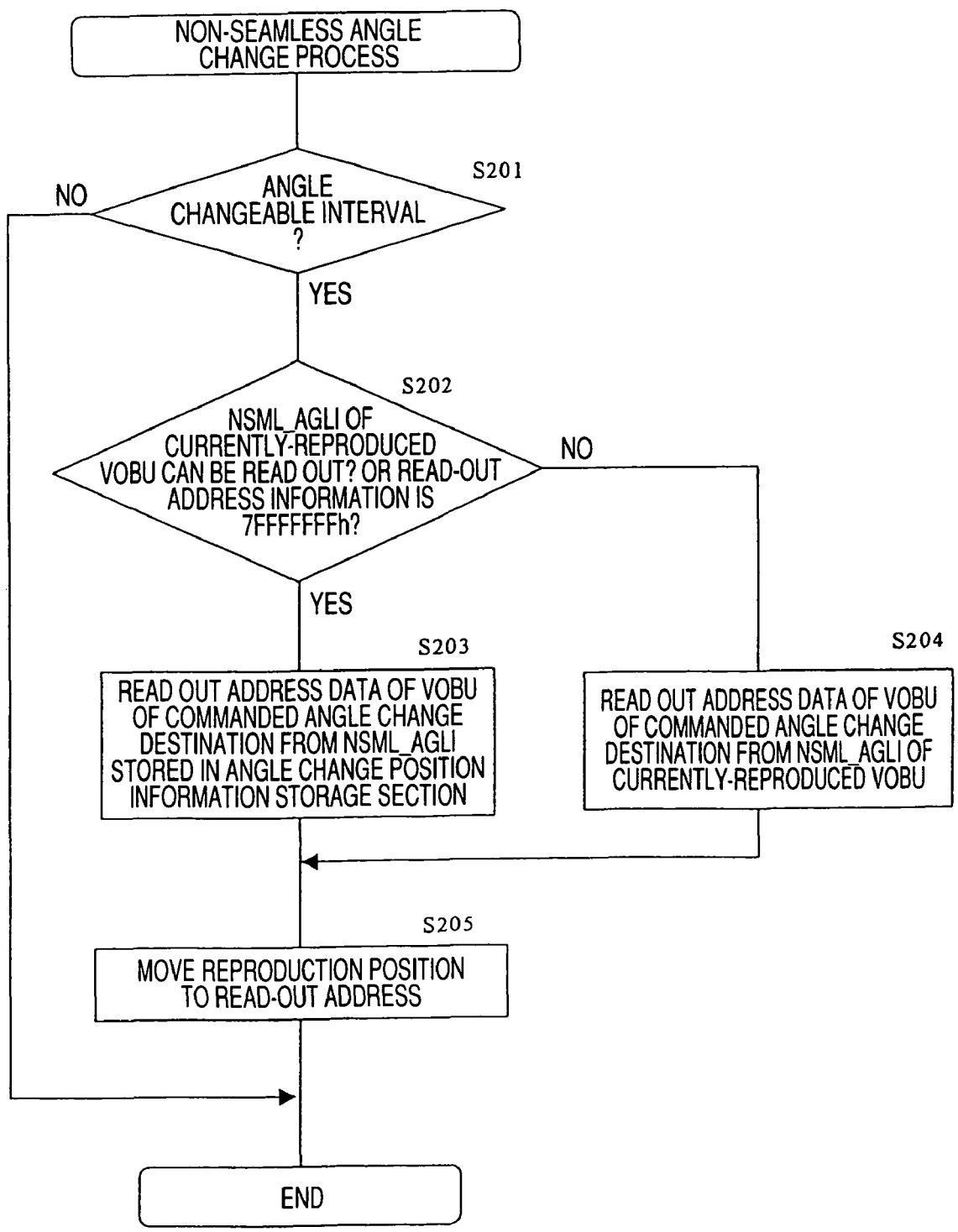
FIG. 18 is a flowchart for explaining a non-seamless angle shift process according to the first embodiment of the present invention.

When the controller 103 receives through the input device 104 a shift command for shifting currently-reproduced angle to another angle, at a timing of a shift command in Step S204 in a flowchart of a non-seamless angle shift process FIG. 18, the controller 103 generally reads out address data of a VOBU of a commanded angle change destination in data of the NSML_AGLI recorded in the NV_PCK of the currently-reproduced VOBU and moves the reproduction position to the read-out address in Step S205.

However, when the angle shift is commanded, if the angle position information determination section 109 determines that data of the NSML_AGLI recorded in the NV_PCK of the currently-reproduced VOBU cannot be read out or that the read-out address is an unsuitable value in Step S202, the controller 103 reads out address data of a VOBU of the commanded angle change destination of the NSML_AGLI of the last-time or before-last-time reproduced VOBU stored in the angle change position information storage section 105 in Step S203 and moves the reproduction position to the read-out address in Step S205, thereby performing angle change.

Figure 3:
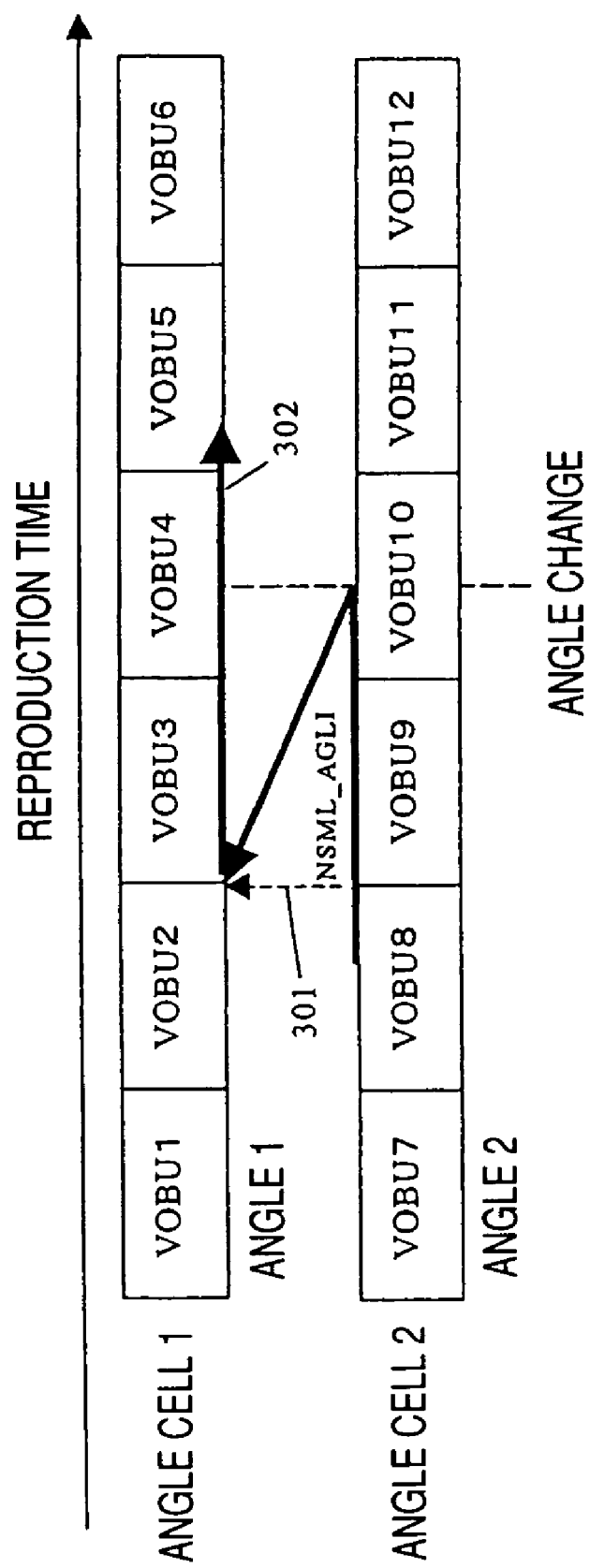
FIG. 3 is a view for explaining an outline of non-seamless angle change performed by using data of an angle change position information storage section.

FIG. 3 is a view for explaining an outline of non-seamless angle change performed by using data of an angle change position information storage section 105. During reproduction of a VOBU 10 of an angle cell 2, when the controller 103 receives through the input device 104 a shift command for shifting to an angle cell 1, if the data of the NSML_AGLI recorded in the NV_PCK of the VOBU 10 cannot be read out or if the read-out address is an unsuitable value, the controller 103 acquires VOBU address data for shifting to the angle cell 1 from the NSML_AGLI recorded in the NV_PCK of the VOBU 9 stored in the angle change position information storage section 105 and moves the reproduction position to a front end of the VOBU 3, thereby starting reproduction. A dotted line 301 denotes movement to the VOBU 3 according to the NSML_AGLI in the VOBU 9. A solid line 302 denotes an actual reproduction sequence, and reproduction is performed in a sequence of VOBU 10->VOBU 3->VOBU 4.

As described above, when the NSML_AGLI in the VOBU 9 is not stored in the angle change position information storage section 105, the angle change is performed based on the NSML_AGLI of an NV_PCK of an previously stored VOBU (for example, VOBU 8). At this time, since the reproduction position after the angle change returns to a prior position, a redundantly-reproduced scene becomes long.

Next, a case of seamless angle change is described.

During reproduction of an angle scene, that is, an angle cell, the controller 103 acquires the present-time reproduced NV_PCK in Step S101 of a flowchart of FIG. 17, checks a seamless angle changeable interval in Step S102 and Step S103, and stores SML_AGLI recorded in a NV_PCK in a VOBU in a last-time reproduced ILVU in an angle change position information storage section 105 in Step S106. In Step S105, when the angle position information determination section 109 determines that the SML_AGLI in the last-time reproduced ILVU cannot be read out or that the read-out SML_AGLI is explicitly an unsuitable address value such as 7FFFFFFFh, the storing thereof is not performed, so that SML_AGLI of a VOBU in a before-last-time reproduced ILVU is maintained.

Figure 16:
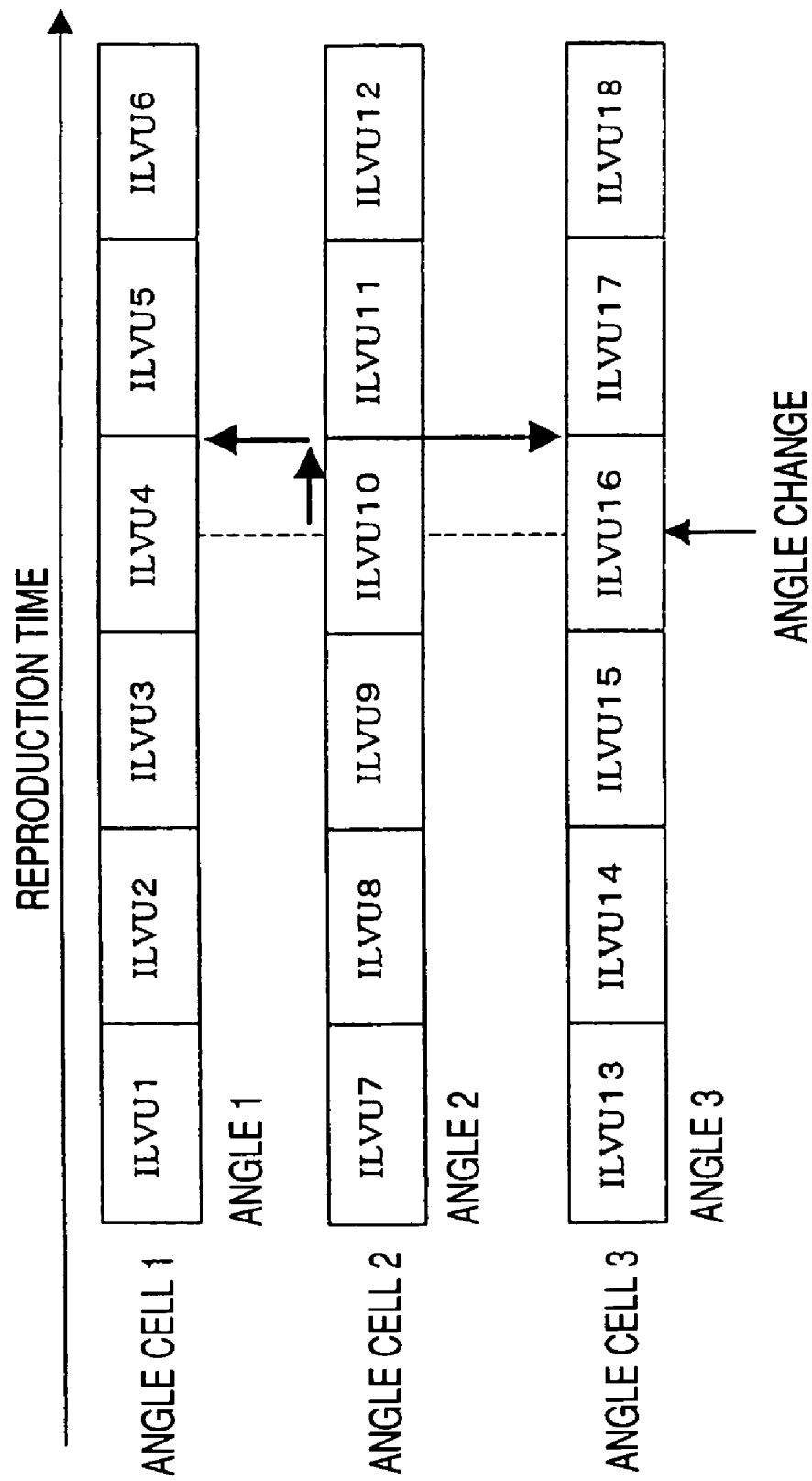
FIG. 16 is a view for explaining seamless angle change.

For example, in FIG. 16, if an ILVU 10 of a current angle cell 2 is in a currently-reproduced state, the controller 103 acquires an NV_PCK in the ILVU 10 and stores SML_AGLI recorded in an NV_PCK in an ILVU 9 in the angle change position information storage section 105. However, when the angle position information determination section 109 determines that the SML_AGLI in the ILVU 9 cannot be read out or that the read-out SML_AGLI is an unsuitable address value, the SML_AGLI of the ILVU 9 is not stored, so that SML_AGLI in a before-last-time reproduced ILVU 8 is stored in the angle change position information storage section 105.

Figure 19:
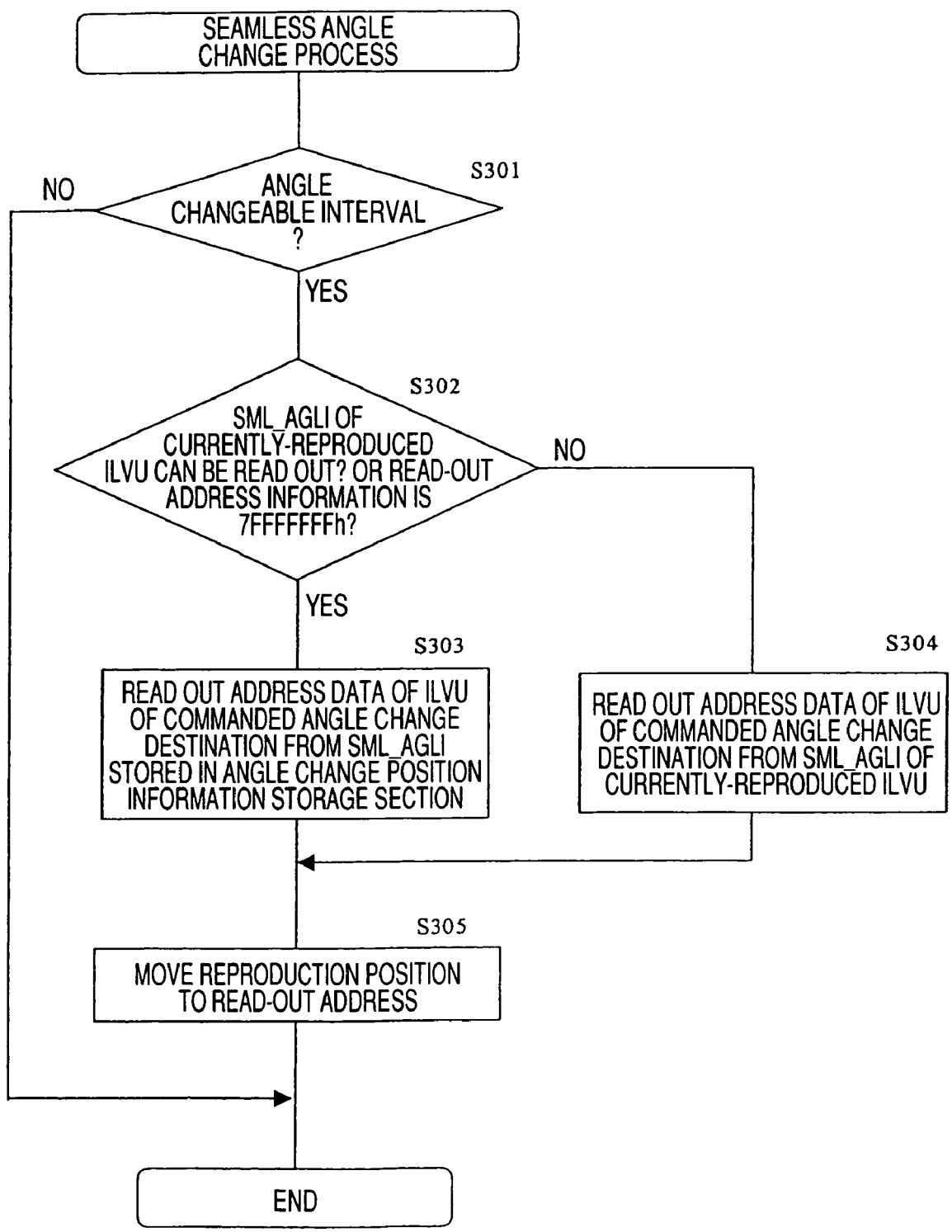
FIG. 19 is a flowchart for explaining a seamless angle shift process according to the first embodiment of the present invention.

When the controller 103 receives through the input device 104 a shift command for shifting currently-reproduced angle to another angle, at a timing of a shift command in Step S304 in a flowchart of a non-seamless angle shift process FIG. 19, the controller 103 generally reads out address data of an ILVU of a commanded angle change destination in data of the SML_AGLI recorded in the NV_PCK of the currently-reproduced ILVU and moves the reproduction position to the read-out address in Step S305.

However, when the angle shift is commanded, if the angle position information determination section 109 determines that data of the SML_AGLI recorded in the NV_PCK of the currently-reproduced ILVU cannot be read out or that the read-out address is an unsuitable value in Step S302, the controller 103 reads out address data of an ILVU of the commanded angle change destination of the SML_AGLI of the last-time or before-last-time reproduced ILVU stored in the angle change position information storage section 105 in Step S303 and moves the reproduction position to the read-out address in Step S305, thereby performing angle change.

Figure 4:
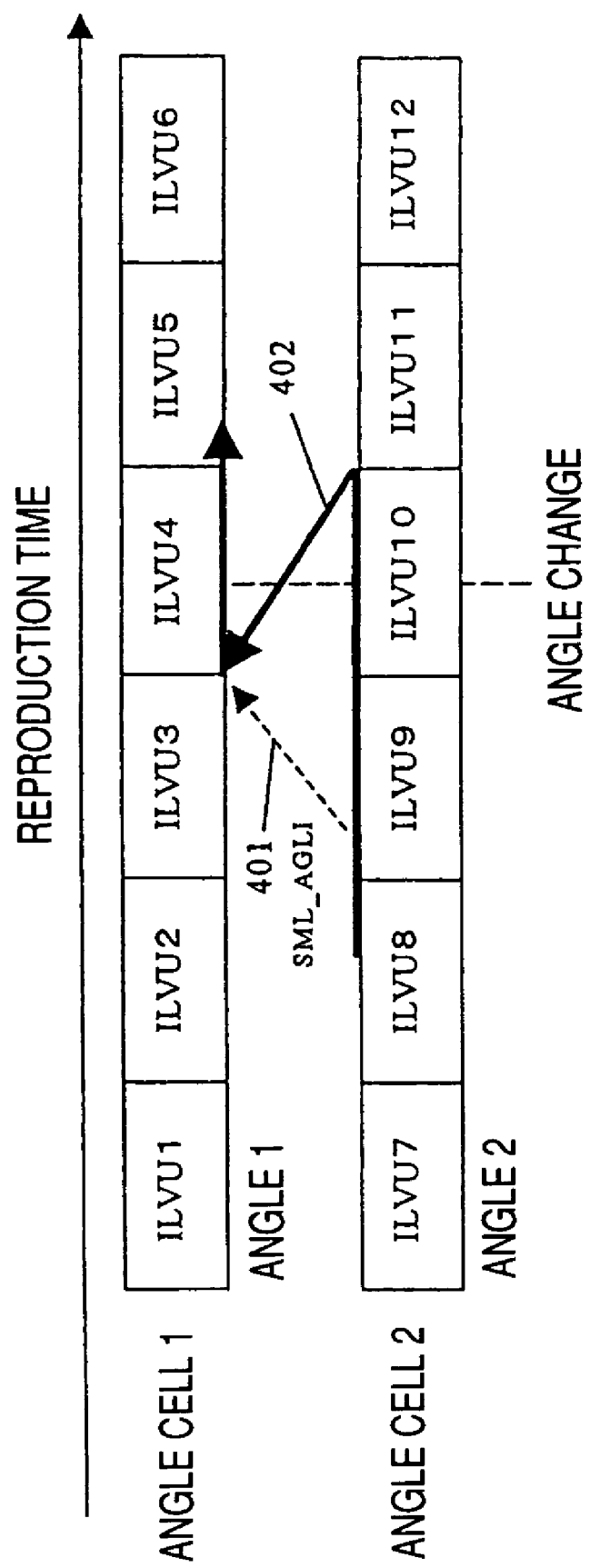
FIG. 4 is a view for explaining an outline of seamless angle change performed by using data of an angle change position information storage section.

FIG. 4 is a view for explaining an outline of seamless angle change performed by using data of an angle change position information storage section 105. During reproduction of an ILVU 10 of an angle cell 2, when the controller 103 receives through the input device 104 a shift command for shifting to an angle cell 1, if the data of the SML_AGLI recorded in the NV_PCK in the VOBU of the ILVU 10 cannot be read out or if the read-out address is an unsuitable value, the controller 103 acquires ILVU address data for shifting to the angle cell 1 from the SML_AGLI recorded in the NV_PCK in the ILVU 9 stored in the angle change position information storage section 105 to perform the reproduction of the ILVU 10 and moves the reproduction position to a front end of the ILVU 4, thereby starting reproduction. A dotted line 401 denotes movement to the ILVU 4 according to the SML_AGLI of the ILVU 9. A solid line 402 denotes an actual reproduction sequence, and reproduction is performed in a sequence of ILVU 9->ILVU 10->ILVU 4.

As described above, when the SML_AGLI of the ILVU 9 is not stored in the angle change position information storage section 105, the angle change is performed based on the SML_AGLI of an NV_PCK of an previously stored ILVU (for example, ILVU 8). At this time, since the reproduction position after the angle change returns to a prior position, a redundantly-reproduced scene becomes long.

Second Embodiment

Figure 5:
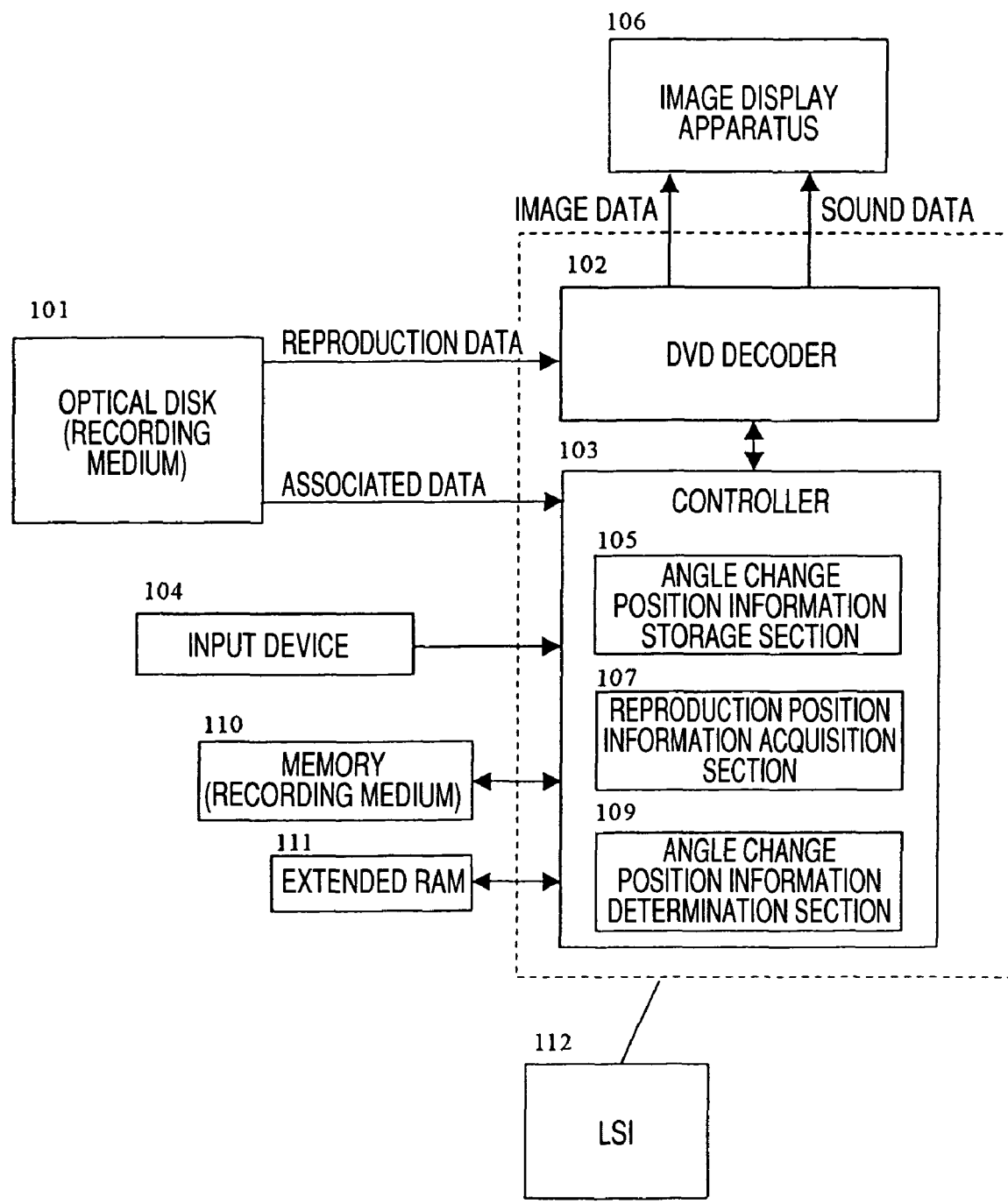
FIG. 5 is a schematic view showing a construction of an image reproducing apparatus according to a second embodiment of the present invention.

FIG. 5 is a schematic view showing a construction of an image reproducing apparatus according to a second embodiment of the present invention. In comparison with the image reproducing apparatus according to the first embodiment, in the image reproducing apparatus according to the second embodiment, a reproduction position information acquisition section 107 is additionally included in the controller 103.

Figure 20:
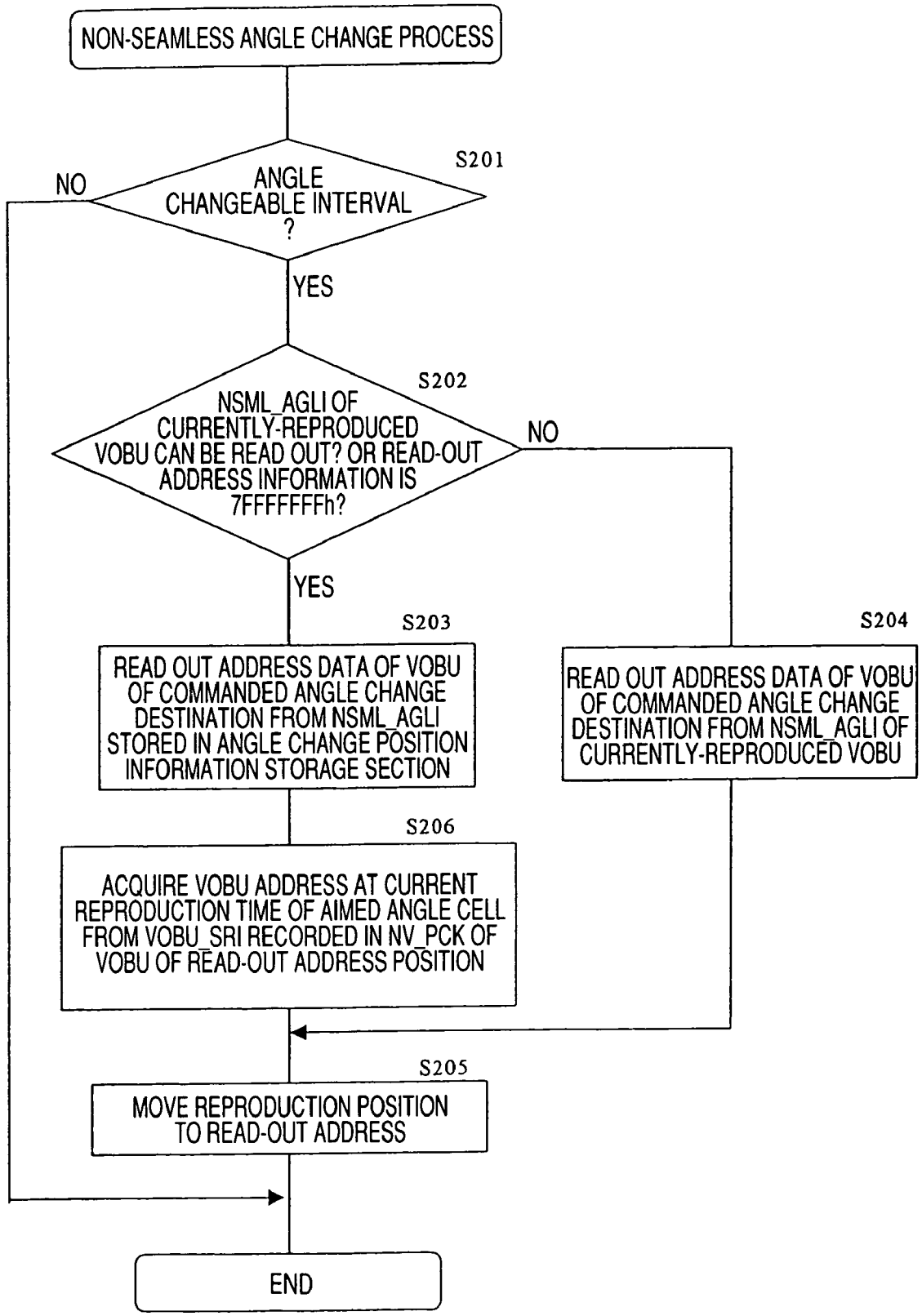
FIG. 20 is a flowchart for explaining a non-seamless angle shift process according to the second embodiment of the present invention.
Figure 21:
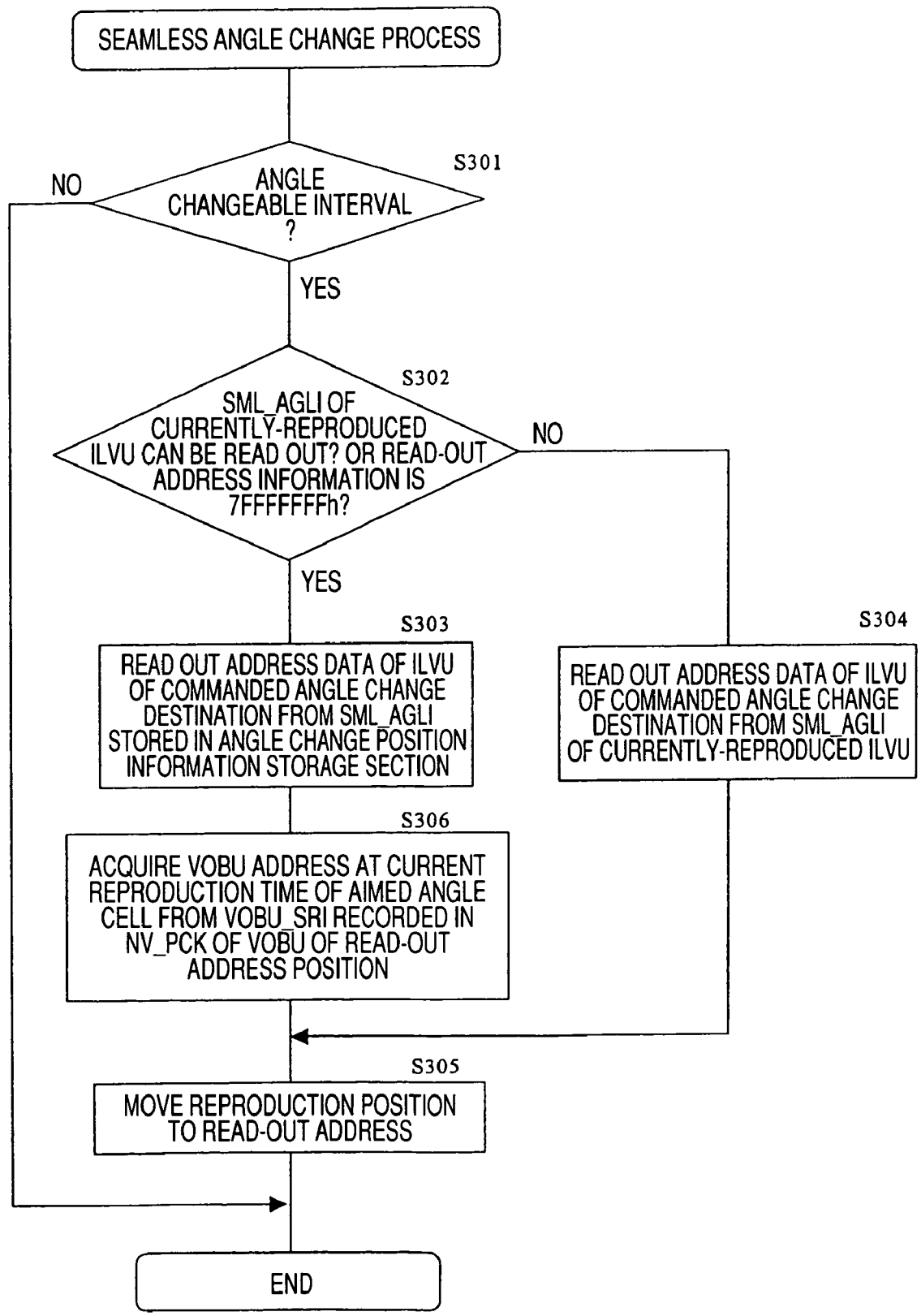
FIG. 21 is a flowchart for explaining a seamless angle shift process according to the second embodiment of the present invention.

Since address data of NSML_AGLI or SML_AGLI stored in the angle change position information storage section 105 is data for a reproduction position prior to a current reproduction time, although change to a commanded angle cell is available, the reproduction position returns to a prior position, so that the same scene is redundantly displayed. Therefore, the reproduction position information acquisition section 107 acquires VOBU address at a current reproduction time of an aimed angle cell from a VOBU_SRI recorded in an NV_PCK of a VOBU as shown in Step S206 of a flowchart of a non-seamless angle shift process of FIG. 20 or in Step S306 of a flowchart of a seamless angle shift process of FIG. 21. Therefore, due to the angle change position information storage section 105 and the reproduction position information acquisition section 107, the reproduction from the VOBU of the current reproduction time of the aimed angle cell can be performed. In the VOBU_SRI, front end addresses of VOBUs that are reproduced for 0.5×n seconds including just-before and just-after VOBUs are recorded.

Figure 6:
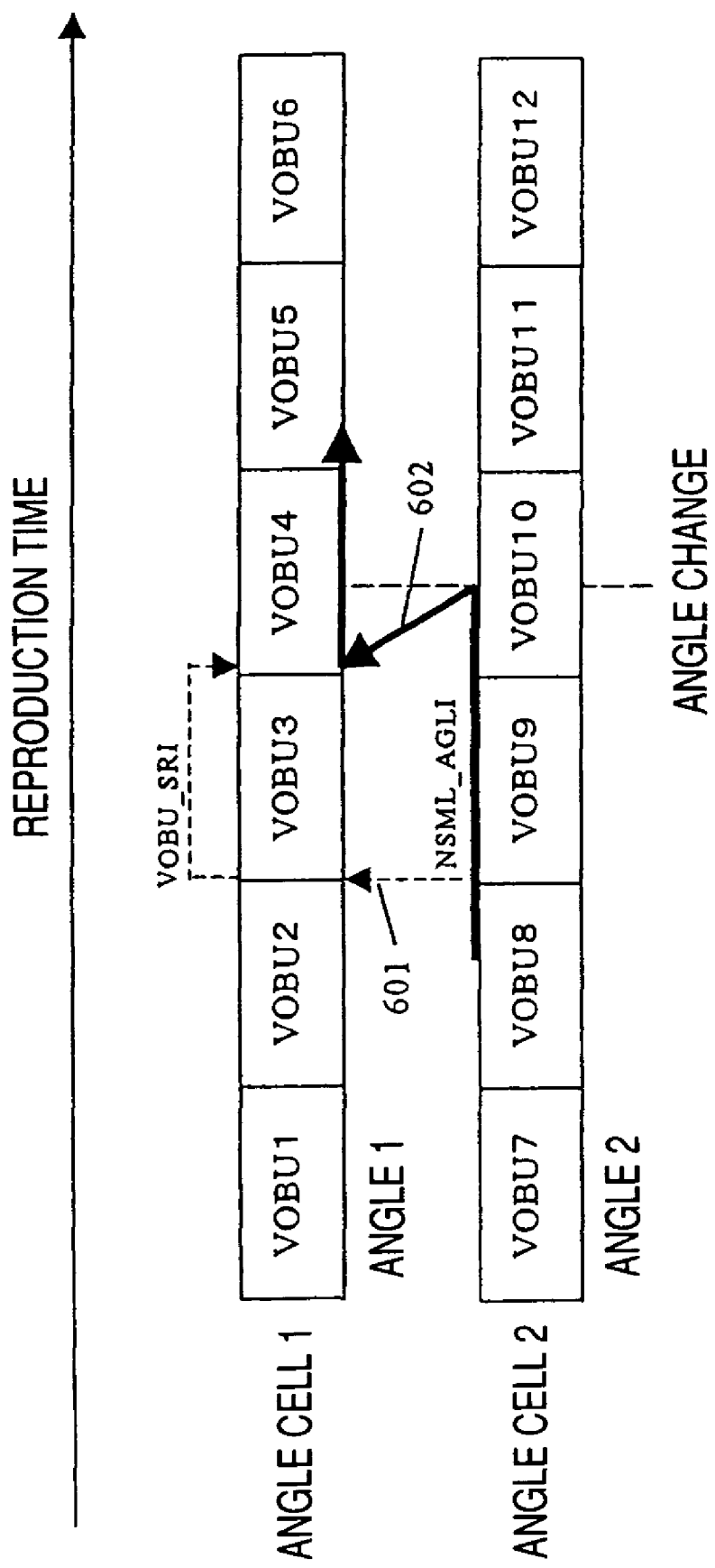
FIG. 6 is a view for explaining an outline of non-seamless angle change performed by using data of a reproduction position information acquisition section in addition to an angle change position information storage section.

FIG. 6 is a view for explaining an outline of non-seamless angle change performed by using data of the reproduction position information acquisition section 107 in addition to the angle change position information storage section 105. During reproduction of a VOBU 10 of an angle cell 2, when the controller 103 receives through the input device 104 a shift command for shifting to an angle cell 1, if the data of the NSML_AGLI recorded in the NV_PCK of the VOBU 10 cannot be read out or if the read-out address is an unsuitable value, the controller 103 acquires VOBU address data for shifting to the angle cell 1 from the NSML_AGLI recorded in the NV_PCK of the VOBU 9 stored in the angle change position information storage section 105 and moves the reproduction position to a front end of the VOBU 3.

In addition, the reproduction position information acquisition section 107 acquires a temporal distance (reproduction position information between the VOBU_SRI in the NV_PCK of the VOBU 3 of the commanded angle 1 to the current reproduction time, and the controller 103 shifts the reproduction position to a rear end of the VOBU 3, that is, a time point equal to the front end of the VOBU 10, and after that, the reproduction is started. A dotted line 601 denotes movement to the VOBU 3 according to the NSML_AGLI in the VOBU 9 and movement to the VOBU 4 according to the VOBU_SRI in the NV_PCK of the VOBU 3. A solid line 602 denotes an actual reproduction sequence, and reproduction is performed in a sequence of VOBU 9->VOBU 10->VOBU 4.

As described above, when the NSML_AGLI in the VOBU 9 is not stored in the angle change position information storage section 105, the angle change is performed based on the NSML_AGLI of an NV_PCK of an previously stored VOBU (for example, VOBU 8). At this time, since the reproduction position information is acquired by the reproduction position information acquisition section 107, the reproduction position after the angle change can become the front end of the VOBU 4, that is, a time point equal to the front end of the VOBU 10.

Figure 7:
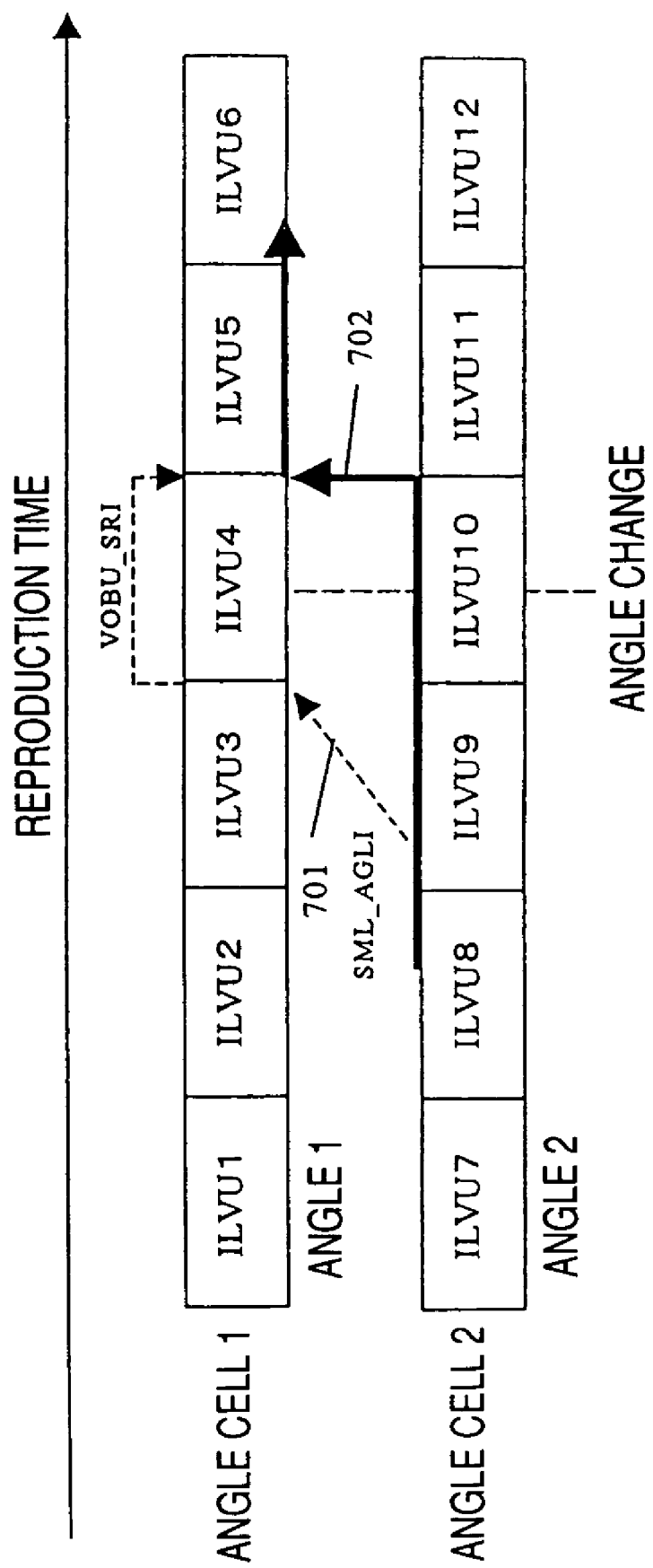
FIG. 7 is a view for explaining an outline of seamless angle change performed by using data of a reproduction position information acquisition section in addition to an angle change position information storage section.

FIG. 7 is a view for explaining an outline of seamless angle change performed by using data of the reproduction position information acquisition section 107 in addition to the angle change position information storage section 105. During reproduction of an ILVU 10 of an angle cell 2, when the controller 103 receives through the input device 104 a shift command for shifting to an angle cell 1, if the data of the SML_AGLI recorded in the NV_PCK in the VOBU of the ILVU 10 cannot be read out or if the read-out address is an unsuitable value, the controller 103 acquires ILVU address data for shifting to the angle cell 1 from the SML_AGLI recorded in the NV_PCK in the ILVU 9 stored in the angle change position information storage section 105 and moves the reproduction position to a front end of the ILVU 4.

In addition, the reproduction position information acquisition section 107 acquires a temporal distance (reproduction position information between the VOBU_SRI in the NV_PCK in the ILVU 4 of the commanded angle 1 to the current reproduction time, and the controller 103 shifts the reproduction position to a rear end of the ILVU 4, that is, a time point equal to the rear end of the ILVU 10, and after that, the reproduction is started. A dotted line 701 denotes movement to the ILVU 4 according to the SML_AGLI of the ILVU 9 and movement to the ILVU 5 according to the VOBU_SRI in the NV_PCK of the VOBU of the ILVU 4. A solid line 702 denotes an actual reproduction sequence, and reproduction is performed in a sequence of ILVU 9->ILVU 10->ILVU 5.

As described above, when the NSML_AGLI of the ILVU 9 is not stored in the angle change position information storage section 105, the angle change is performed based on the NSML_AGLI of an NV_PCK of an previously stored ILVU (for example, ILVU 8). At this time, since the reproduction position information is acquired by the reproduction position information acquisition section 107, the reproduction position after the angle change can become the rear end of the ILVU 4, that is, a time point equal to the rear end of the ILVU 10.

Accordingly, since the reproduction position information acquisition section 107 is additionally provided, even in a case where the NSML_AGLI or the SML_AGLI cannot be read out or a case where the read-out address is an unsuitable value, the reproduction position is not greatly delayed, the shifting to the commanded angle can be performed.

Third Embodiment

Figure 8:
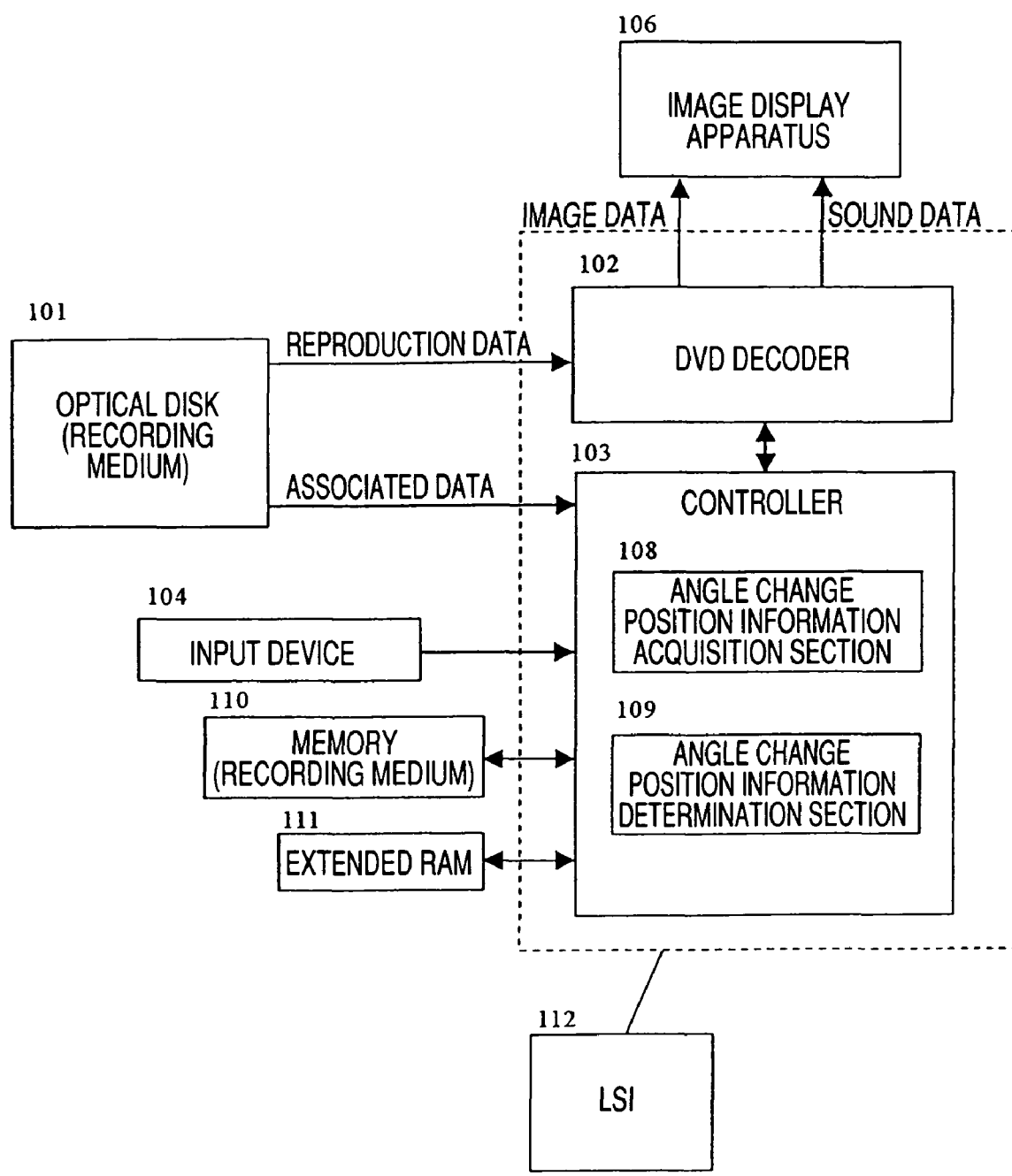
FIG. 8 is a schematic view showing a construction of an image reproducing apparatus according to a third embodiment of the present invention.

FIG. 8 is a schematic view showing a construction of an image reproducing apparatus according to a third embodiment of the present invention. In comparison with the image reproducing apparatus according to the first embodiment, in the image reproducing apparatus according to the third embodiment, instead of the angle change position information storage section 105, a angle change position information acquisition section 108 is included in the controller 103.

Figure 22:
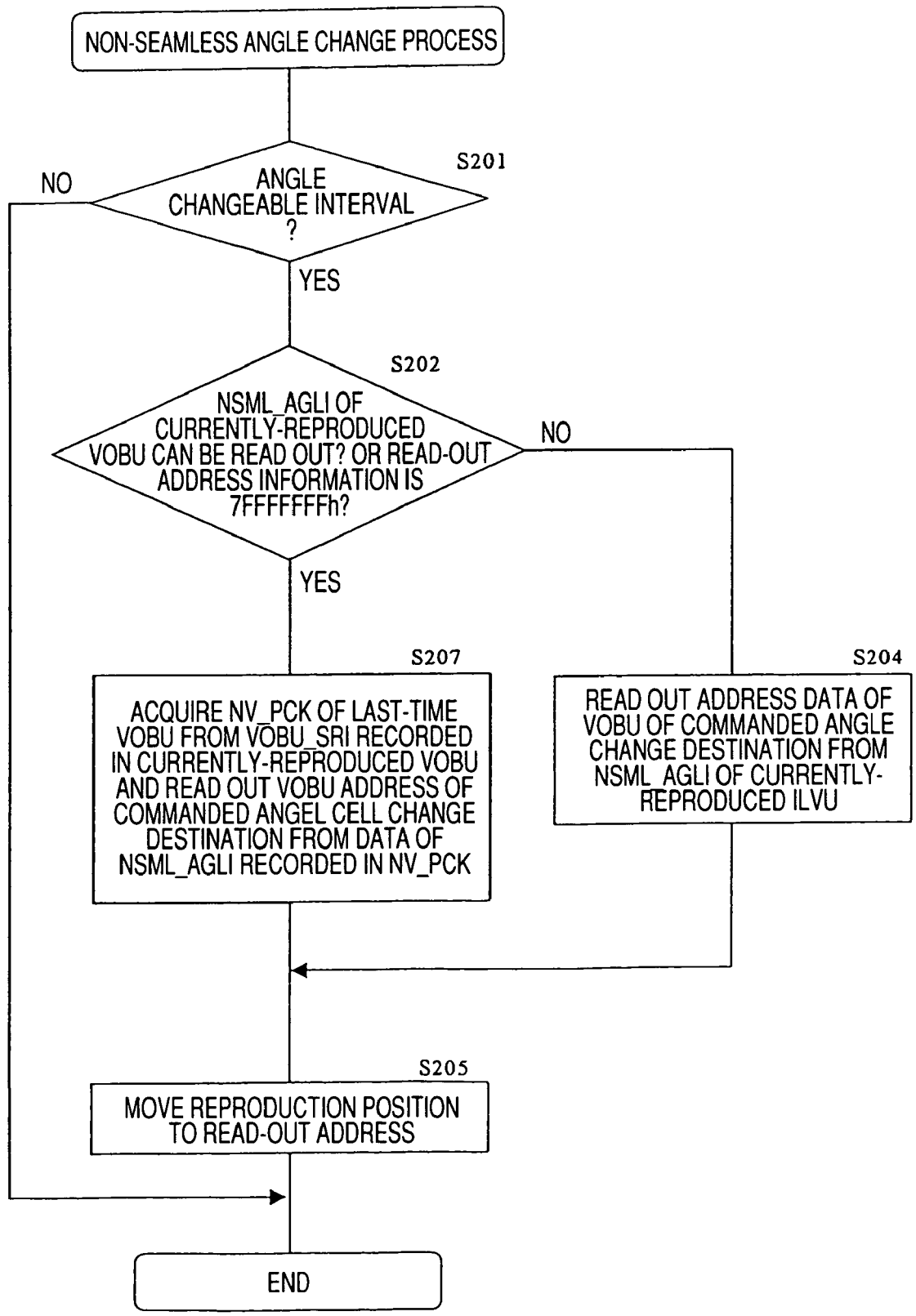
FIG. 22 is a flowchart for explaining a non-seamless angle shift process according to the third embodiment of the present invention.
Figure 23:
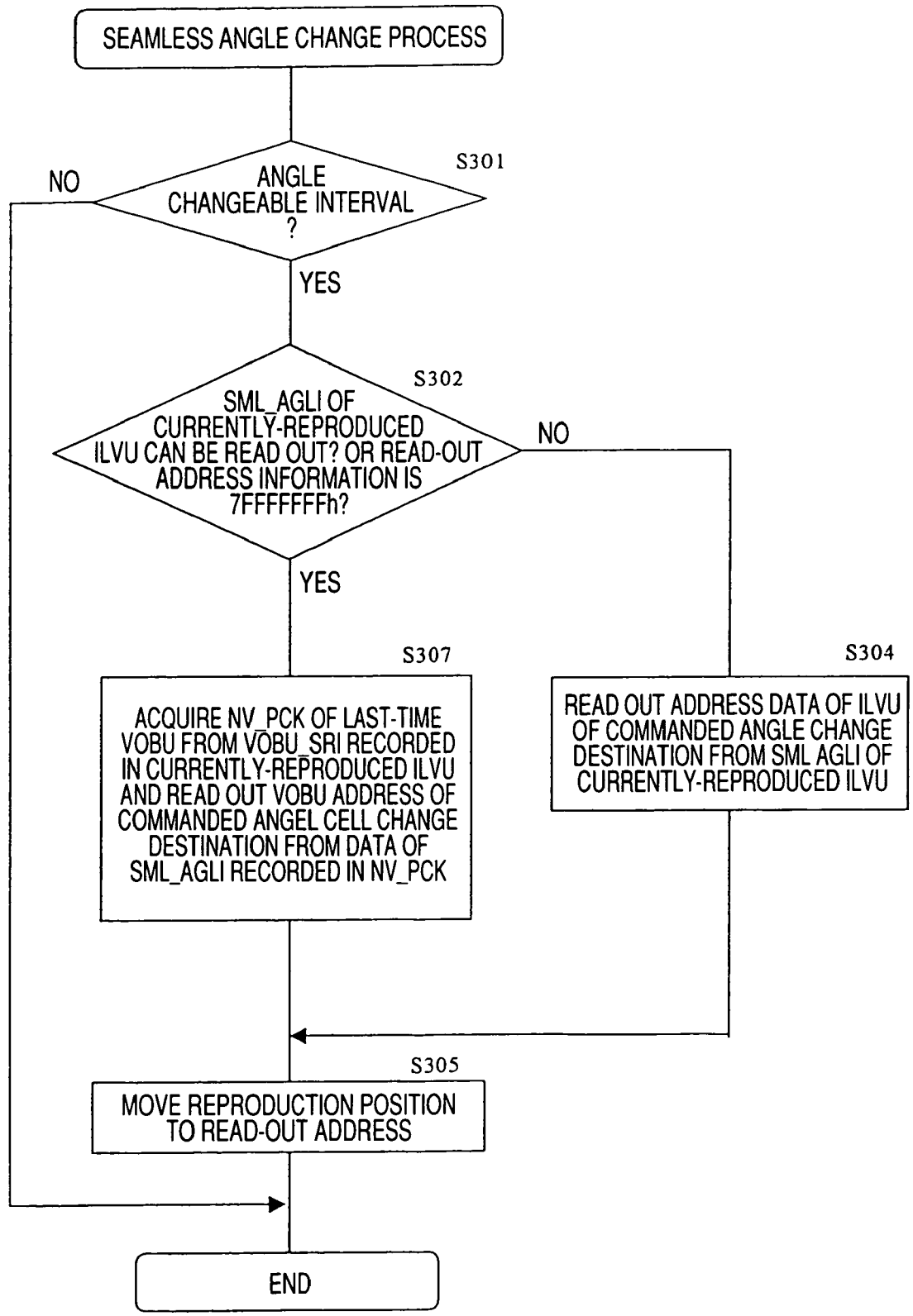
FIG. 23 is a flowchart for explaining a seamless angle shift process according to the third embodiment of the present invention.

The angle change position information acquisition section 108 acquires an NV_PCK of former and later VOBUs (this is, VOBU excluding a currently-reproduced VOBU at a currently-reproduced angle) from a VOBU_SRI recorded in an NV_PCK of a VOBU in the currently-reproduced VOBU or ILVU as shown in Step S207 of a flowchart of a non-seamless angle shift process of FIG. 22 or in Step S307 of a flowchart of a seamless angle shift process of FIG. 23 and acquires NSML_AGLI or SML_AGLI recorded in the NV_PCK. If the NSML_AGLI or the SML_AGLI recorded in the NV_PCK of the currently-reproduced VOBU cannot be read out or if the read-out address is an unsuitable value, the angle change is performed based on the NSML_AGLI or the SML_AGLI recorded in the NV_PCK of the former or later VOBU (with respect to the currently-reproduced VOBU) acquired by the angle change position information acquisition section 108.

Figure 9:
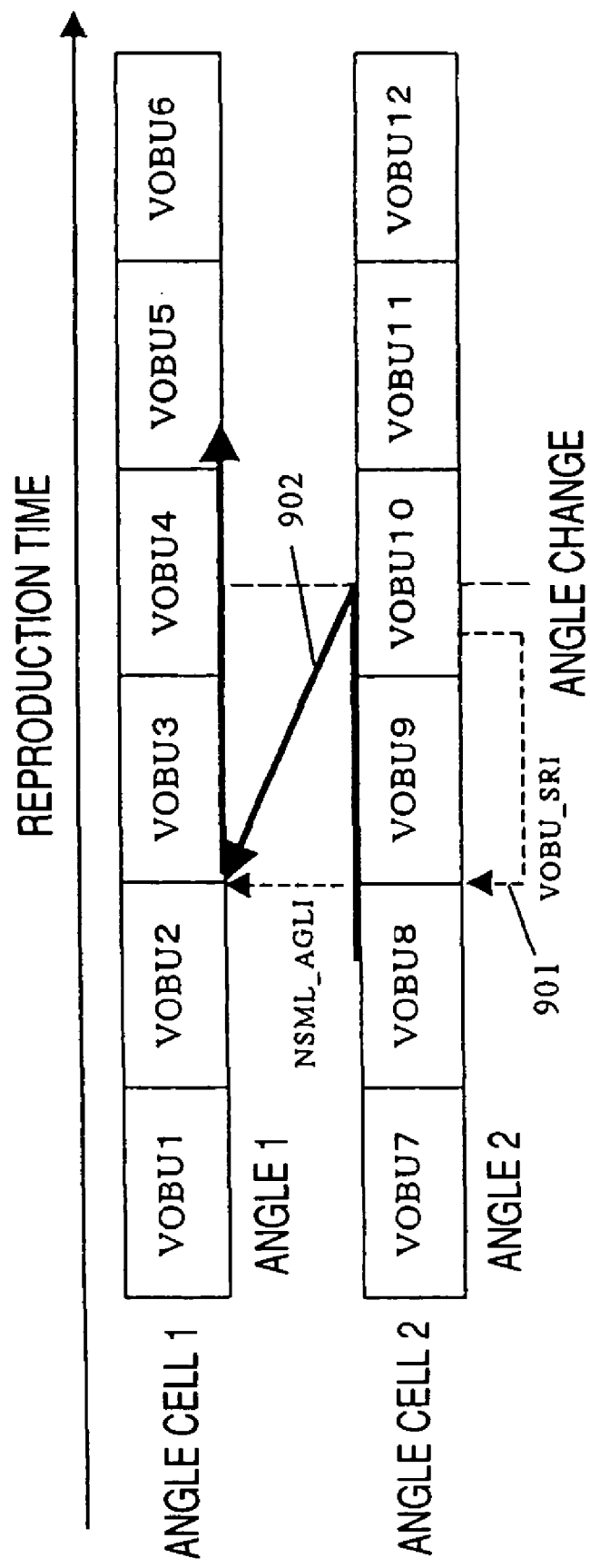
FIG. 9 is a view for explaining an outline of non-seamless angle change performed by using data of an angle change position information acquisition section.

FIG. 9 is a view for explaining an outline of non-seamless angle change performed by using data of an angle change position information acquisition section 108. During reproduction of a VOBU 10 of an angle cell 2, when the controller 103 receives through the input device 104 a shift command for shifting to an angle cell 1, if the data of the NSML_AGLI recorded in the NV_PCK of the VOBU 10 cannot be read out or if the read-out address is an unsuitable value, the controller 103 allows the angle change position information acquisition section 108 to acquire the NV_PCK of the VOBU 9 from the VOBU_SRI recorded in the NV_PCK of the currently-reproduced VOBU 10 and acquire the NSML_AGLI recorded in the NV_PCK. The controller 103 acquires VOBU address data for shifting to the angle 1 from the NSML_AGLI in the VOBU 9 acquired by the angle change position information acquisition section 108 and moves the reproduction position to a front end of the VOBU 3, thereby starting reproduction. A dotted line 901 denotes movement to the VOBU 3 according to the NSML_AGLI in the VOBU 9. A solid line 902 denotes an actual reproduction sequence, and reproduction is performed in a sequence of VOBU 9->VOBU 10->VOBU 3.

Figure 10:
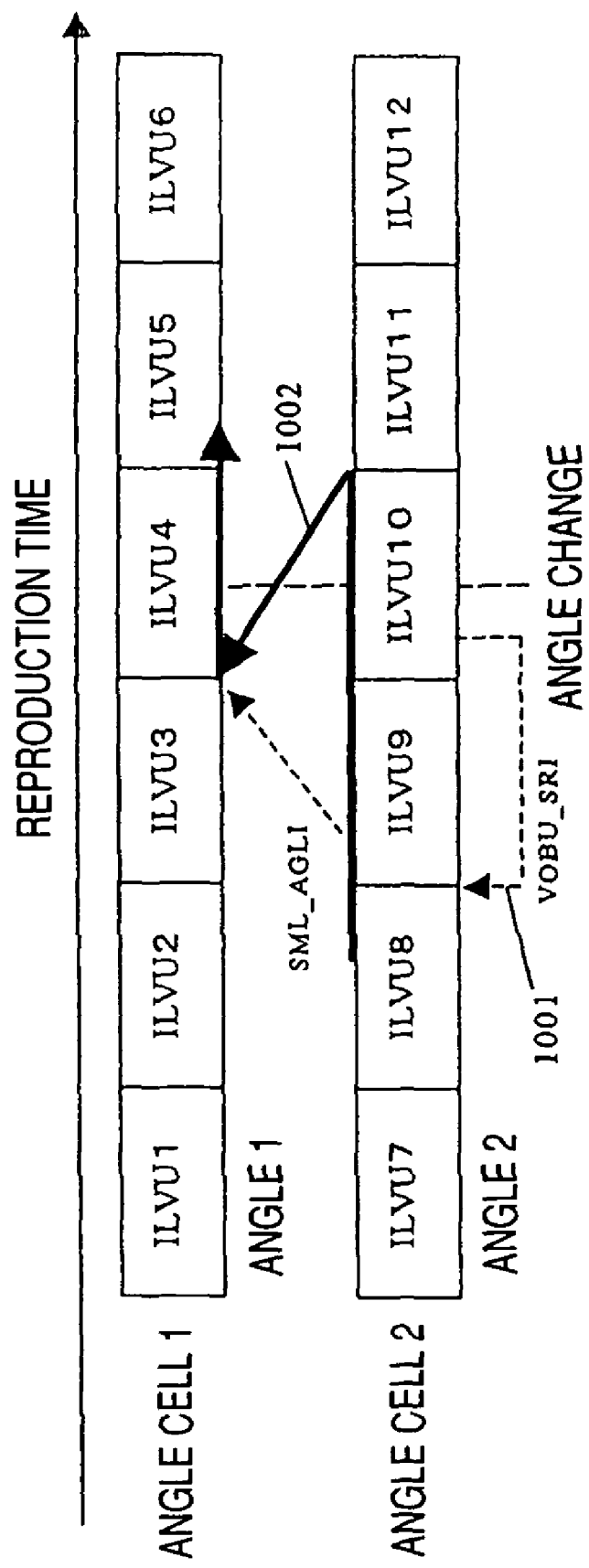
FIG. 10 is a view for explaining an outline of seamless angle change performed by using data of an angle change position information acquisition section.

FIG. 10 is a view for explaining an outline of seamless angle change performed by using data of an angle change position information acquisition section 108. During reproduction of an ILVU 10 of an angle cell 2, when the controller 103 receives through the input device 104 a shift command for shifting to an angle cell 1, if the data of the SML_AGLI recorded in the NV_PCK in the VOBU of the ILVU 10 cannot be read out or if the read-out address is an unsuitable value, the controller 103 allows the angle change position information acquisition section 108 to acquire the NV_PCK in the VOBU of the ILVU 9 from the VOBU_SRI recorded in the NV_PCK in the VOBU of the currently-reproduced ILVU 10 and acquire the SML_AGLI recorded in the NV_PCK. The controller 103 acquires ILVU address data for shifting to the angle 1 from the SML_AGLI in the VOBU of the ILVU 9 acquired by the angle change position information acquisition section 108 to perform the reproduction of the ILVU 10 and moves the reproduction position to a front end of the ILVU 4, thereby starting reproduction. A dotted line 1001 denotes movement to the ILVU 9 according to the VOBU_SRI of the ILVU 10 and movement to the ILVU 4 according to the SML_AGLI of the ILVU 9. A solid line 1002 denotes an actual reproduction sequence, and reproduction is performed in a sequence of ILVU 9->ILVU 10->ILVU 4.

Fourth Embodiment

Figure 11:
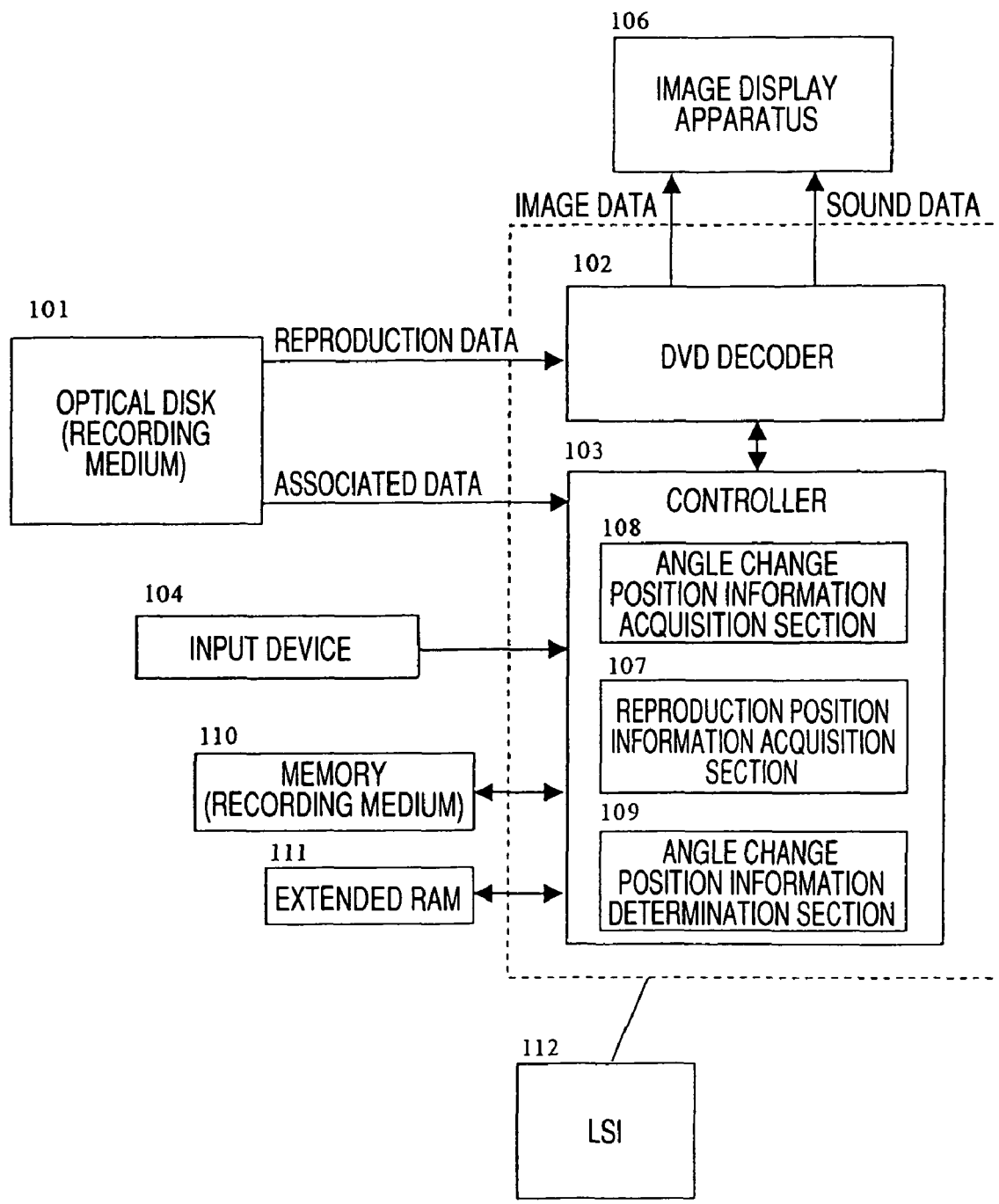
FIG. 11 is a schematic view showing a construction of an image reproducing apparatus according to a fourth embodiment of the present invention.

FIG. 11 is a schematic view showing a construction of an image reproducing apparatus according to a fourth embodiment of the present invention. In comparison with the image reproducing apparatus according to the third embodiment, in the image reproducing apparatus according to the fourth embodiment, a reproduction position information acquisition section 107 is additionally included in the controller 103.

Figure 24:
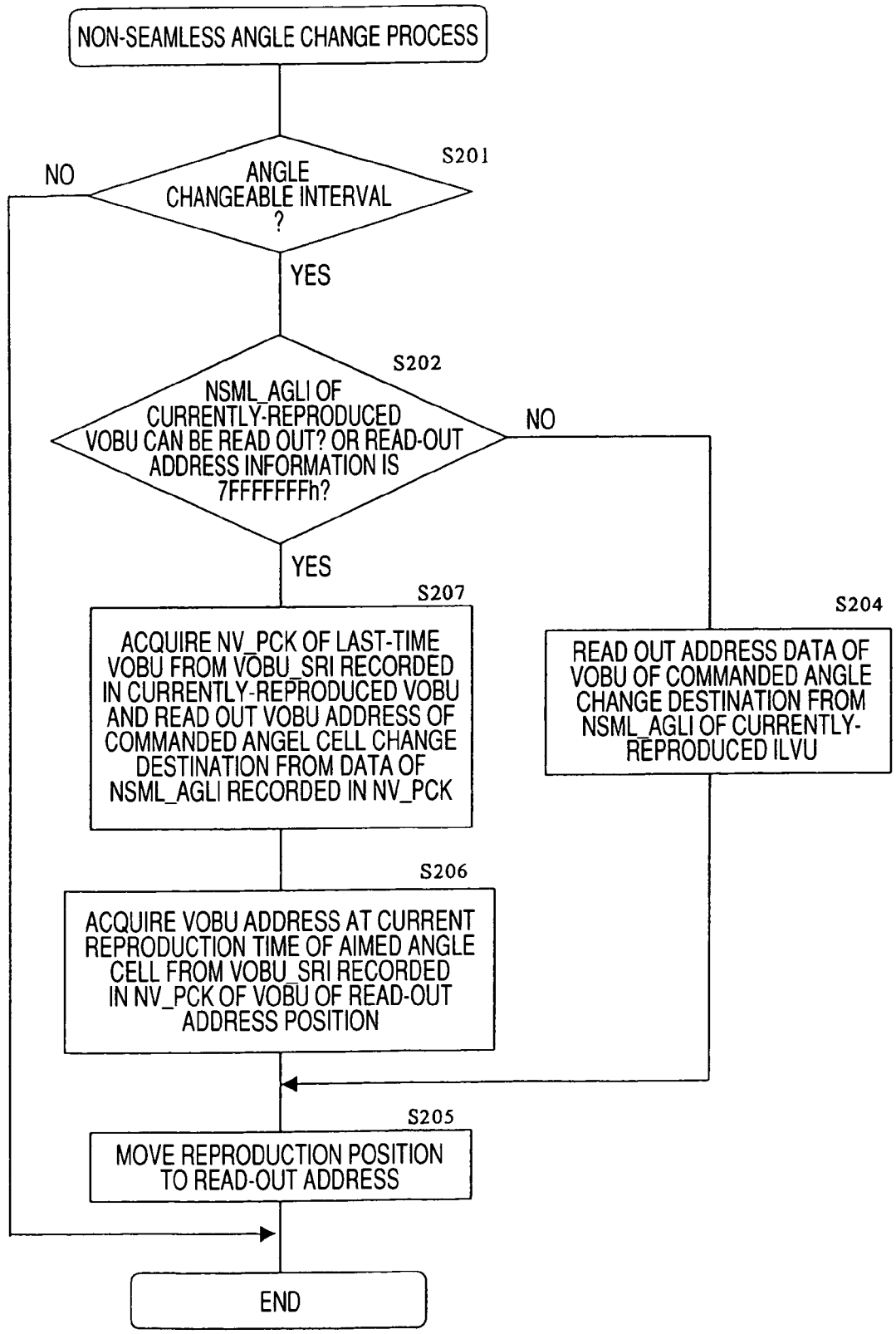
FIG. 24 is a flowchart for explaining a non-seamless angle shift process according to the fourth embodiment of the present invention.
Figure 25:
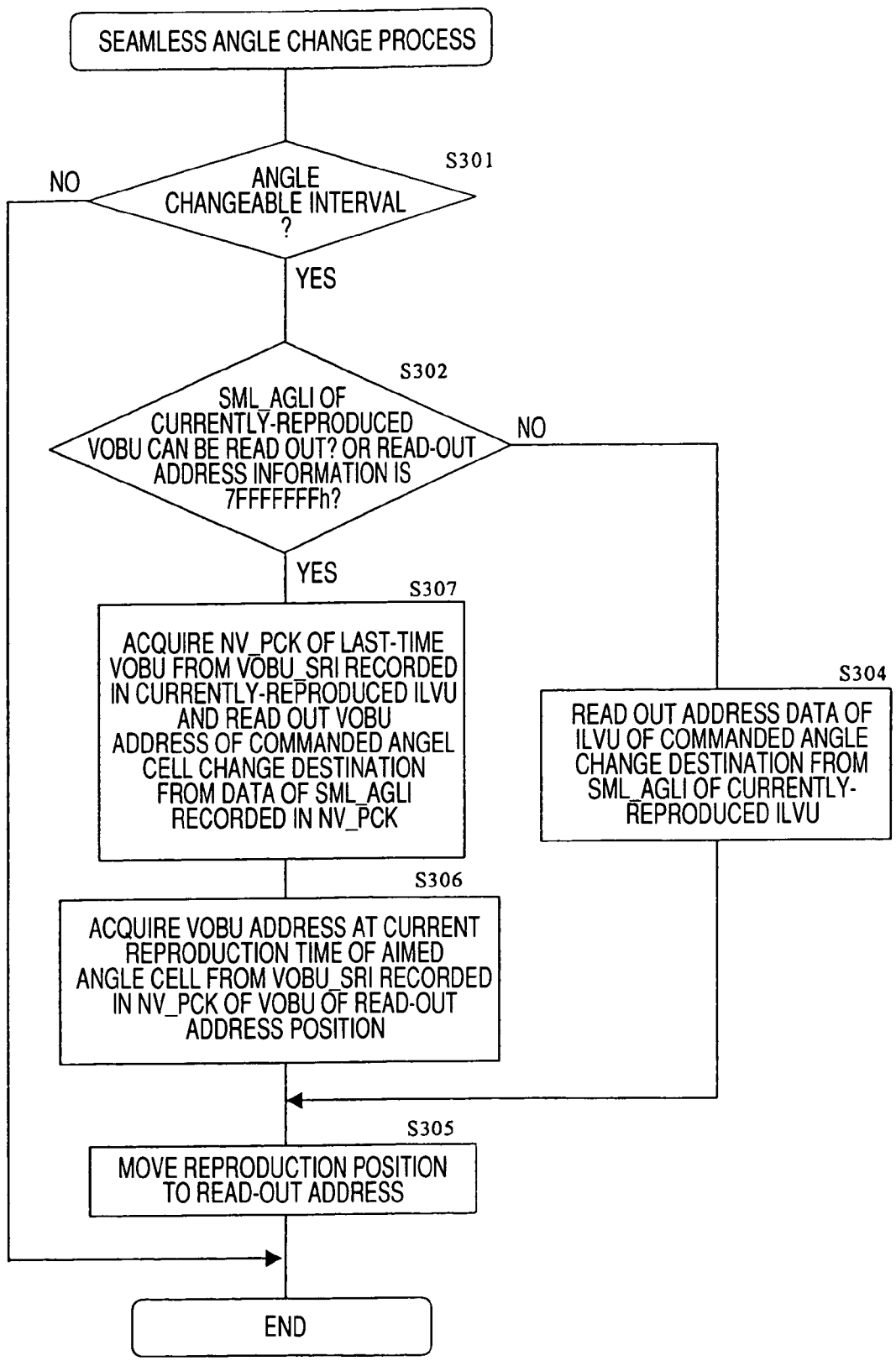
FIG. 25 is a flowchart for explaining a seamless angle shift process according to the fourth embodiment of the present invention.

Since address data of NSML_AGLI or SML_AGLI acquired by the angle change position information acquisition section 108 is data for a reproduction position prior to a current reproduction time, although change to a commanded angle cell is available, the reproduction position returns to a prior position, so that the same scene is redundantly displayed. Therefore, the reproduction position information acquisition section 107 acquires VOBU address at a current reproduction time of an aimed angle cell from a VOBU_SRI recorded in an NV_PCK of a VOBU as shown in Step S206 of a flowchart of a non-seamless angle shift process of FIG. 24 or in Step S306 of a flowchart of a seamless angle shift process of FIG. 25. Therefore, in Step S207 of FIG. 24 and Step S307 of FIG. 25, due to the angle change position information acquisition section 108 and the reproduction position information acquisition section 107, the reproduction from the VOBU of the current reproduction time of the aimed angle cell can be performed. In the VOBU_SRI, front end addresses of VOBUs that are reproduced for 0.5×n seconds including just-before and just-after VOBUs are recorded.

Figure 12:
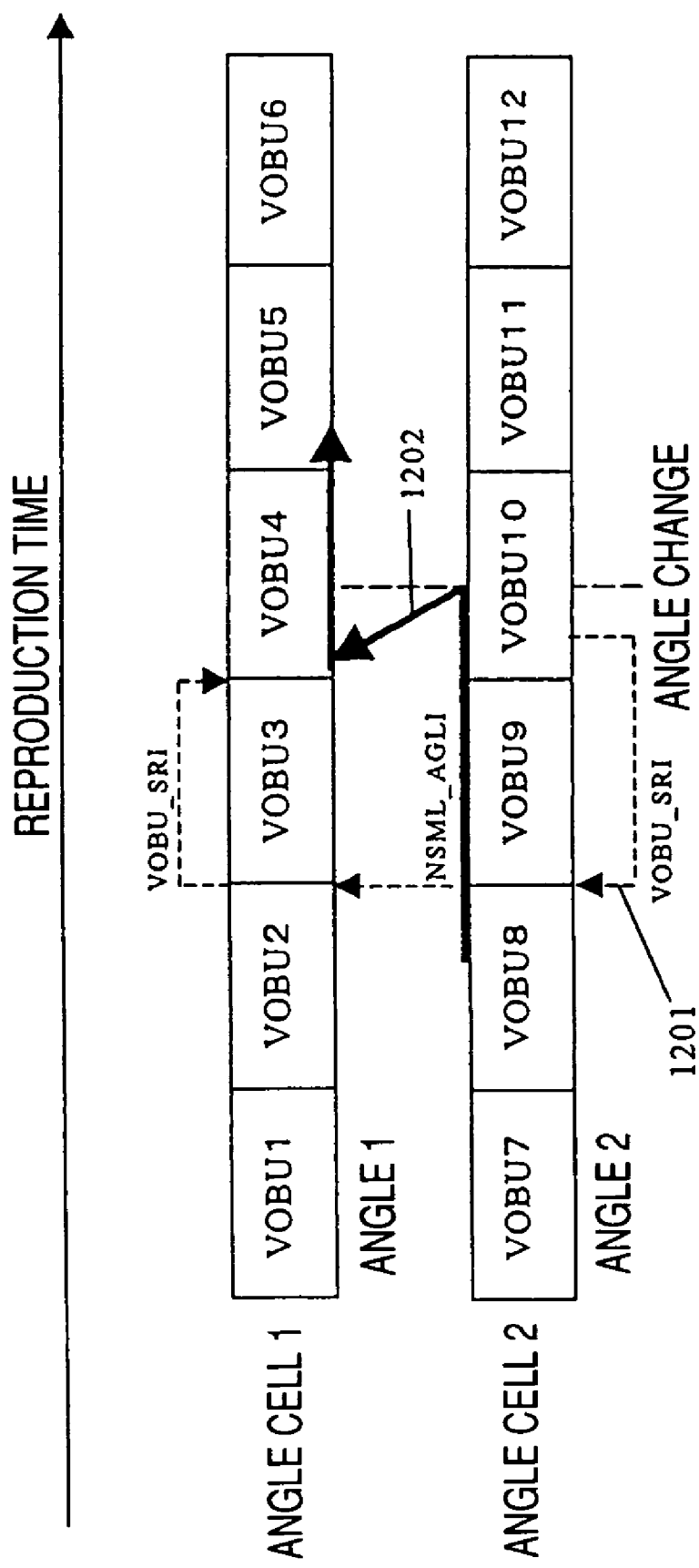
FIG. 12 is a view for explaining an outline of non-seamless angle change performed by using data of a reproduction position information acquisition section in addition to an angle change position information acquisition section.

FIG. 12 is a view for explaining an outline of non-seamless angle change performed by using data of the reproduction position information acquisition section 107 in addition to the angle change position information acquisition section 108. During reproduction of a VOBU 10 of an angle cell 2, when the controller 103 receives through the input device 104 a shift command for shifting to an angle cell 1, if the data of the NSML_AGLI recorded in the NV_PCK of the VOBU 10 cannot be read out or if the read-out address is an unsuitable value, the controller 103 allows the angle change position information acquisition section 108 to acquire the NV_PCK of the VOBU 9 from the VOBU_SRI recorded in the NV_PCK of the currently-reproduced VOBU 10 and acquire the NSML_AGLI recorded in the NV_PCK. The controller 103 acquires VOBU address data for shifting to the angle 1 from the NSML_AGLI in the VOBU 9 and moves the reproduction position to a front end of the VOBU 3.

In addition, the reproduction position information acquisition section 107 acquires a temporal distance (reproduction position information between the VOBU_SRI in the NV_PCK of the VOBU 3 of the commanded angle 1 to the current reproduction time, and the controller 103 shifts the reproduction position to a rear end of the VOBU 3, that is, a time point equal to the front end of the VOBU 10, and after that, the reproduction is started. A dotted line 1201 denotes movement to the VOBU 4 according to the VOBU_SRI of the VOBU 10, movement to the VOBU 3 according to the NSML_AGLI in the VOBU 9 and movement to the VOBU 4 according to the VOBU_SRI in the NV_PCK of the VOBU 3. A solid line 1202 denotes an actual reproduction sequence, and reproduction is performed in a sequence of VOBU 9->VOBU 10->VOBU 4.

Figure 13:
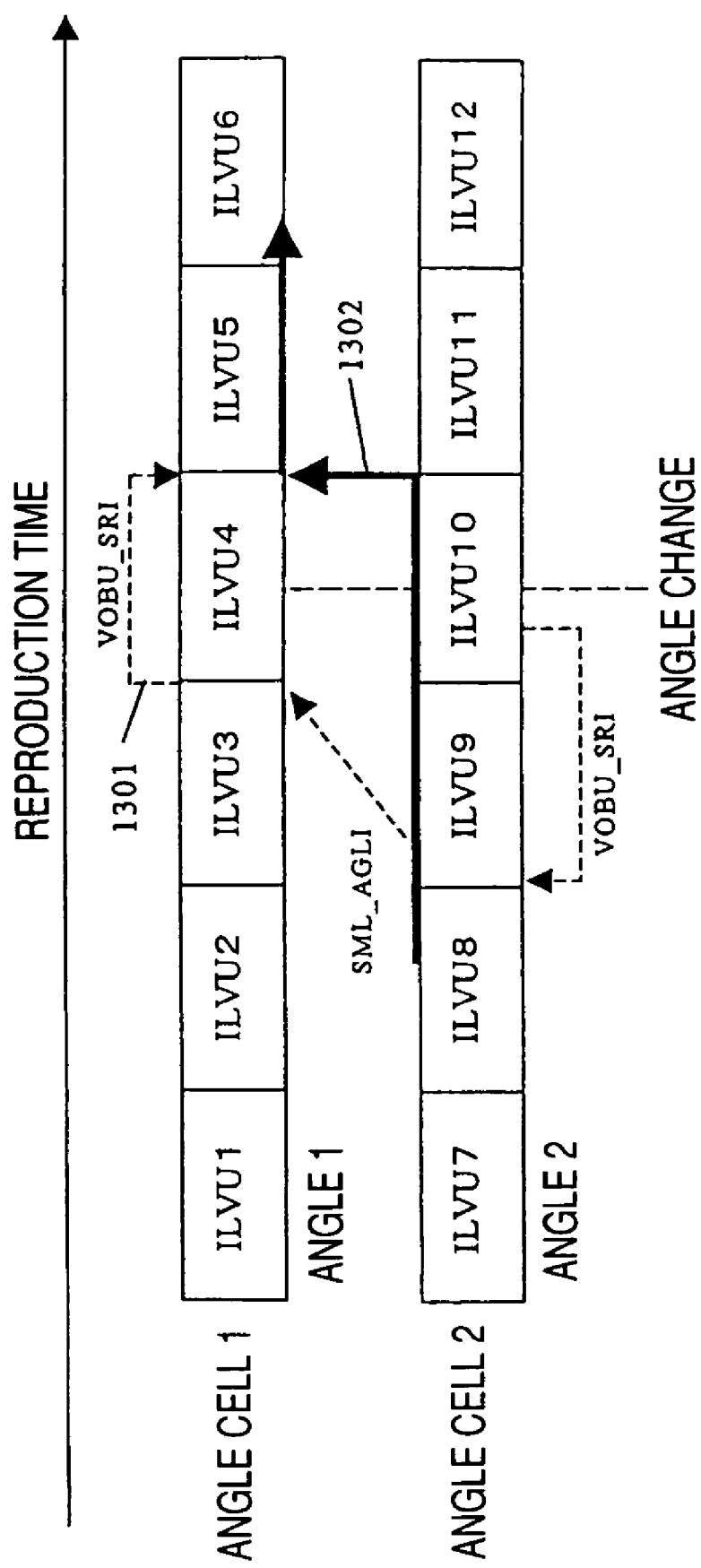
FIG. 13 is a view for explaining an outline of seamless angle change performed by using data of a reproduction position information acquisition section in addition to an angle change position information acquisition section.

FIG. 13 is a view for explaining an outline of seamless angle change performed by using data of the reproduction position information acquisition section 107 in addition to the angle change position information acquisition section 108. During reproduction of an ILVU 10 of an angle cell 2, when the controller 103 receives through the input device 104 a shift command for shifting to an angle cell 1, if the data of the SML_AGLI recorded in the NV_PCK in the VOBU of the ILVU 10 cannot be read out or if the read-out address is an unsuitable value, the controller 103 allows the angle change position information acquisition section 108 to acquire the NV_PCK in the VOBU of the ILVU 9 from the VOBU_SRI recorded in the NV_PCK in the VOBU of the currently-reproduced ILVU 10 and acquire the SML_AGLI recorded in the NV_PCK. The controller 103 acquires ILVU address data for shifting to the angle 1 from the SML_AGLI in the VOBU of the ILVU 9 and moves the reproduction position to a front end of the ILVU 4.

In addition, the reproduction position information acquisition section 107 acquires a temporal distance (reproduction position information between the VOBU_SRI in the NV_PCK in the ILVU 4 of the commanded angle 1 to the current reproduction time, and the controller 103 shifts the reproduction position to a rear end of the ILVU 4, that is, a time point equal to the rear end of the ILVU 10, and after that, the reproduction is started. A dotted line 1301 denotes movement to the ILVU 9 according to the VOBU_SRI of the ILVU 10, movement to the ILVU 4 according to the SML_AGLI of the ILVU 9 and movement to the ILVU 5 according to the VOBU_SRI in the NV_PCK in the ILVU 4. A solid line 1302 denotes an actual reproduction sequence, and reproduction is performed in a sequence of ILVU 9->ILVU 10->ILVU 5.

Fifth Embodiment

Figure 14:
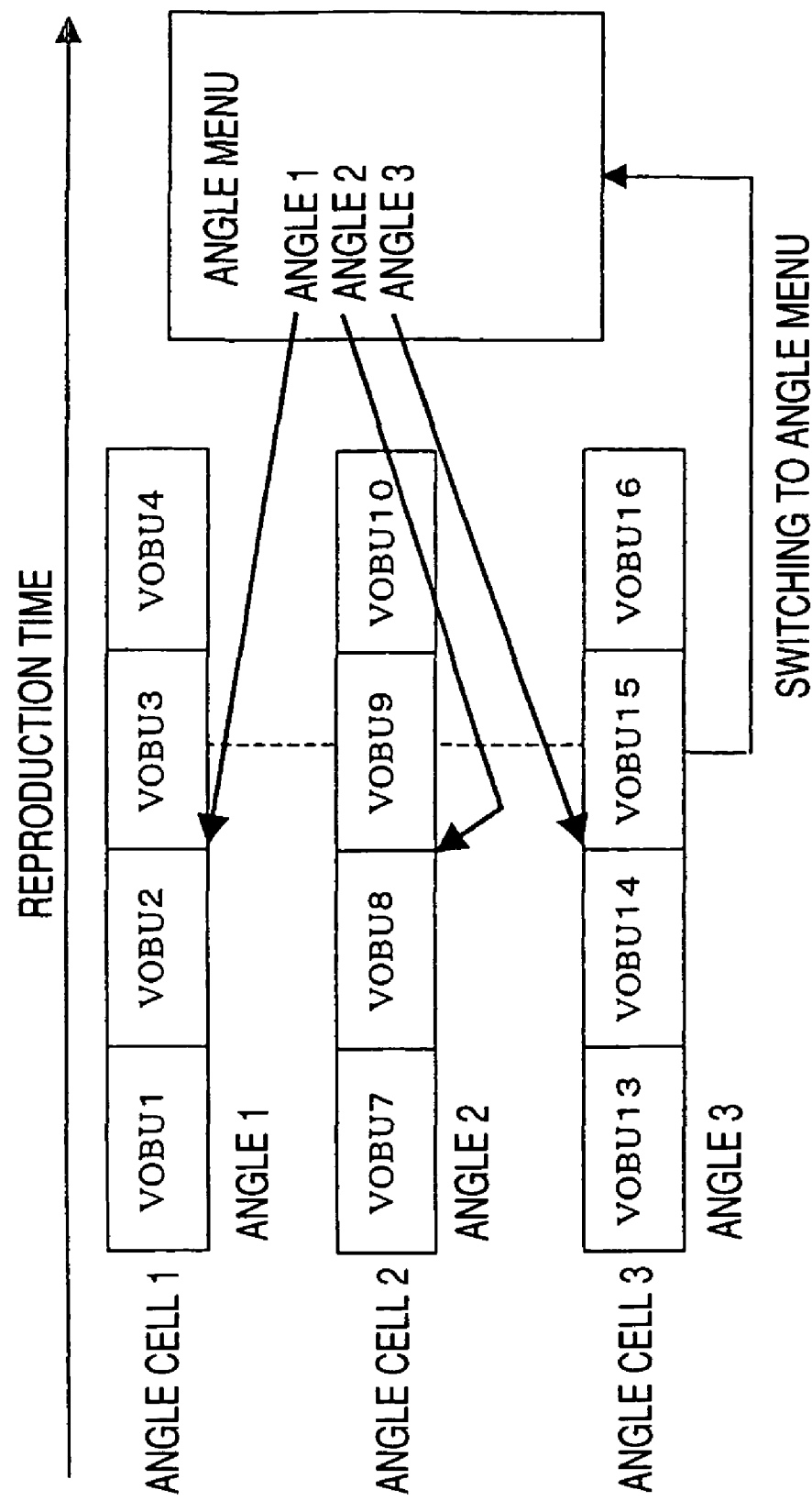
FIG. 14 is a schematic view showing an angle shift state of an image reproducing apparatus according to a fifth embodiment of the present invention.

FIG. 14 is a schematic view showing an angle shift state of an image reproducing apparatus according to a fifth embodiment of the present invention. In addition to a case where a shift command of shifting the currently-reproduced angle to another angle is directly input from the input device to the controller, the present invention may be employed to an image reproducing apparatus of switching to an angle menu, performing the angle change in the angle menu, and restoring a before-menu-switching reproduction position by using a menu resume function. The image reproducing apparatus according to the fifth embodiment may employ any one of the image reproducing apparatuses according to the first to fourth embodiments. Therefore, description on a construction of the image reproducing apparatus is omitted.

During reproduction of an angle cell, if a command of switching to angle menu is input from the input device 104, the controller 103 stores the NV_PCK of the currently-reproduced VOBU as resume information, reads out the navigation data and the presentation data of the angle menu from an optical disk 101. The presentation data is decoded by the DVD decoder 102, so that the angle menu is displayed on the image reproducing apparatus 106.

When a commanded angle is selected from the angle menu through the input device 104, the controller 103 acquires destination address of the VOBU corresponding to the selected angle from the NSML_AGLI or the SML_AGLI recorded in the NV_PCK stored as the resume information and performs the reproduction. If the NSML_AGLI or the SML_AGLI recorded in the NV_PCK stored as the resume information cannot be read out or if the read-out address is an unsuitable value, the shifting to the commanded angle cannot be performed, and the reproduction restoring cannot be performed. Therefore, the menu resume function cannot be implemented.

In the image reproducing apparatus according to the fifth embodiment, before the switching to the angle menu is performed, the NSML_AGLI or the SML_AGLI recorded in the VOBU excluding the VOBU reproduced at the currently-reproduced angle is acquired, so that the angle change to the reproduction restoring position can be performed, so that the menu resume function can be implemented. The angle change operations of the image reproducing apparatus according to the fifth embodiment are the same as those of the image reproducing apparatuses according to the first to fourth embodiments, and thus, description thereof is omitted.

Function blocks of the DVD decoder 102, the controller 103, and the like in the first to fifth embodiments may be typically implemented on an integrated circuit such as LSI. These function blocks may be integrated into a single chip. In addition, some or all of the function blocks may be integrated into a single chip. In addition, these function blocks together with the memory 110 or the extended RAM 111 may be integrated into a single chip.

Here, although the LSI is exemplified, an IC system LSI, a super LSI, and an ultra LSI having different integration degrees may be collectively referred as an LSI.

In addition, any integrated circuit techniques which are to be developed according to advance of semiconductor technique and other derivative techniques may be used for integration of the function blocks.

According to the preset invention, even in a case where angle change position information cannot be acquired from a currently-reproduced reproduction unit or a case where the angle change position information acquired from the currently-reproduced reproduction unit is an unsuitable value, it is possible to perform angle change without stopping reproduction by using angle change position information stored in advance. In addition, the present invention is usefully employed in an image reproducing apparatus, an image reproducing method, and image reproducing program for selectively reproducing and outputting image data of an arbitrary angle from image data of a plurality of angles including a plurality of reproduction units.

What is claimed is:

1. An image reproducing apparatus for selectively reproducing and outputting image data of an arbitrary angle from image data of a plurality of angles including a plurality of reproduction units, comprising:
    an angle position information determination section, which determines whether or not angle change is available based on angle change position information representing an address of an angle change destination recorded in the reproduction units;
    a controller, which changes an angle of a reproduced image data by using the angle change position information representing the address of the angle change destination recorded in the reproduction units; and
    an angle change position information storage, which stores the angle change position information recorded in the reproduction units excluding a currently-reproduced reproduction unit at a currently-reproduced angle,
    wherein, if the angle position information determination section determines that the angle change cannot be performed by using the angle change position information recorded in the currently-reproduced reproduction unit, the controller changes the angle of the reproduced image data by using the angle change position information stored in the angle change position information storage.

2. The image reproducing apparatus according to claim 1, wherein the controller comprise a reproduction position information acquisition unit which acquires reproduction position information at the current reproduction time at the angle of change destination from the reproduction units represented by used angle change position information, and
    wherein the controller changes the angle of the reproduced image data based on the acquired reproduction position information.

3. An image reproducing apparatus for selectively reproducing and outputting image data of an arbitrary angle from image data of a plurality of angles including a plurality of reproduction units, comprising:
    an angle position information determination section, which determines whether or not angle change is available based on angle change position information representing an address of an angle change destination recorded in the reproduction units;
    a controller, which changes an angle of a reproduced image data by using the angle change position information representing the address of the angle change destination recorded in the reproduction units; and
    an angle change position information acquisition unit, which acquires the angle change position information recorded in the reproduction units excluding a currently-reproduced reproduction unit at a currently-reproduced angle;
    wherein, if the angle position information determination section determines that the angle change cannot be performed by using the angle change position information recorded in the currently-reproduced reproduction unit, the controller changes the angle of the reproduced image data by using the angle change position information acquired by the angle change position information acquisition unit.

4. The image reproducing apparatus according to claim 3, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

5. An image reproducing apparatus for selectively reproducing and outputting image data of an arbitrary angle from image data of a plurality of angles including a plurality of reproduction units, comprising:

an angle position information determination section, which determines whether or not angle change is available based on angle change position information representing an address of an angle change destination recorded in the reproduction units;

a controller, which changes an angle of a reproduced image data by using the angle change position information representing the address of the angle change destination recorded in the reproduction units; and an angle change position information storage, which stores the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the controller changes the angle of the reproduced image data by using the angle change position information stored in the angle change position information storage.

6. The image reproducing apparatus according to claim 5, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

7. An image reproducing apparatus for selectively reproducing and outputting image data of an arbitrary angle from image data of a plurality of angles including a plurality of reproduction units, comprising:

an angle position information determination section, which determines whether or not angle change is available based on angle change position information representing an address of an angle change destination recorded in the reproduction units;

a controller, which changes an angle of a reproduced image data by using the angle change position information representing the address of the angle change destination recorded in the reproduction units; and an angle change position information acquisition unit, which acquires the angle change position information recorded in the reproduction units excluding a reproduced reproduction unit at an angle reproduced before switching to an angle menu;

wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the controller changes the angle of the reproduced image data by using the angle change position information acquired by the angle change position information acquisition unit.

8. The image reproducing apparatus according to claim 7, wherein the controller comprise a reproduction position information acquisition unit which acquires reproduction position information at the current reproduction time at the angle of change destination from the reproduction units represented by used angle change position information; and wherein the controller changes the angle of the reproduced image data based on the acquired reproduction position information.

9. The image reproducing apparatus according to claim 1, 3, 5, or 7, wherein, if angle change position information representing an address of an angle change destination cannot be acquired or if the acquired address is 7FFFFFFFh, the angle position information determination section determines that the angle change cannot be performed.

10. The image reproducing apparatus according to claim 1, 3, 5, or 7, wherein the reproduced image data and the angle change position information are data in accordance with a DVD-Video standard.

11. An integrated circuit of an image reproducing apparatus for selectively reproducing and outputting image data of an arbitrary angle from image data of a plurality of angles including a plurality of reproduction units, the integrated circuit comprising:

a reproducer, which decodes input reproduction data into image data and sound data and outputs the image data and the sound data;

an angle position information determination section, which determines whether or not angle change is available based on angle change position information representing an address of an angle change destination recorded in the reproduction units;

a controller, which changes an angle of a reproduced image data by using the angle change position information representing the address of the angle change destination recorded in the reproduction units; and an angle change position information storage, which stores the angle change position information recorded in the reproduction units excluding a currently-reproduced reproduction unit at a currently-reproduced angle;

wherein, if the angle position information determination section determines that the angle change cannot be performed by using the angle change position information recorded in the currently-reproduced reproduction unit, the controller changes the angle of the reproduced image data by using the angle change position information stored in the angle change position information storage.

12. The integrated circuit according to claim 11, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

13. An integrated circuit of an image reproducing apparatus for selectively reproducing and outputting image data of an arbitrary angle from image data of a plurality of angles including a plurality of reproduction units, the integrated circuit comprising:

a reproducer, which decodes input reproduction data into image data and sound data and outputs the image data and the sound data;

an angle position information determination section, which determines whether or not angle change is available based on angle change position information representing an address of an angle change destination recorded in the reproduction units;

a controller, which changes an angle of a reproduced image data by using the angle change position information representing the address of the angle change destination recorded in the reproduction units; and an angle change position information acquisition unit, which acquire the angle change position information recorded in the reproduction units excluding a currently-reproduced reproduction unit at a currently-reproduced angle;

wherein, if the angle position information determination section determines that the angle change cannot be performed by using the angle change position information recorded in the currently-reproduced reproduction unit, the controller changes the angle of the reproduced image data by using the angle change position information acquired by the angle change position information acquisition unit.

14. The integrated circuit according to claim 13, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

15. An integrated circuit of an image reproducing apparatus for selectively reproducing and outputting image data of an arbitrary angle from image data of a plurality of angles including a plurality of reproduction units, the integrated circuit comprising:

a reproducer, which decodes input reproduction data into image data and sound data and outputs the image data and the sound data;

an angle position information determination section, which determines whether or not angle change is available based on angle change position information representing an address of an angle change destination recorded in the reproduction units;

a controller, which changes an angle of a reproduced image data by using the angle change position information representing the address of the angle change destination recorded in the reproduction units; and an angle change position information storage, which stores the angle change position information recorded in the reproduction units excluding a reproduced reproduction unit at an angle reproduced before switching to an angle menu;

wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the controller changes the angle of the reproduced image data by using the angle change position information stored in the angle change position information storage.

16. The integrated circuit according to claim 15, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

17. An integrated circuit of an image reproducing apparatus for selectively reproducing and outputting image data of an arbitrary angle from image data of a plurality of angles including a plurality of reproduction units, the integrated circuit comprising:

a reproducer, which decodes input reproduction data into image data and sound data and outputs the image data and the sound data;

an angle position information determination section, which determines whether or not angle change is available based on angle change position information representing an address of an angle change destination recorded in the reproducer;

a controller, which changes an angle of a reproduced image data by using the angle change position information representing the address of the angle change destination recorded in the reproduction units; and an angle change position information acquisition unit, which acquires the angle change position information recorded in the reproduction units excluding a reproduced reproduction unit at an angle reproduced before switching to an angle menu, wherein, when reproduction restoring is performed from the angle menu by using a menu resume function, if the angle position information determination section determines that the angle change cannot be performed by using the angle change position information recorded in the reproduction unit reproduced at the angle reproduced before switching to the angle menu, the controller changes the angle of the reproduced image data by using the angle change position information acquired by the angle change position information acquisition unit.

18. The integrated circuit according to claim 17, wherein the controller comprise reproduction position information acquisition unit which acquires reproduction position information at the current reproduction time at the angle of change destination from the reproduction units represented by used angle change position information, and wherein the controller changes the angle of the reproduced image data based on the acquired reproduction position information.

19. The integrated circuit according to claim 11, 13, 15 or 17, wherein, if angle change position information representing an address of an angle change destination cannot be acquired or if the acquired address is 7FFFFFFFh, the angle position information determination section determines that the angle change cannot be performed.

20. The integrated circuit according to claim 11, 13, 15 or 17, wherein the reproduced image data and the angle change position information are data in accordance with a DVD-Video standard.

21. An image reproducing method of selectively reproducing and outputting image data of an arbitrary angle from image data of a plurality of angles including a plurality of reproduction units, comprising:

an angle position information determination step of determining whether or not angle change is available based on angle change position information representing an address of an angle change destination recorded in the reproduction units;

an angle change position information storage step of storing the angle change position information representing the address of the angle change destination recorded in the reproduction units excluding a currently-reproduced reproduction unit at a currently-reproduced angle; and a control step of, if in the angle position information determination step it is determined that the angle change cannot be performed by using the angle change position information recorded in the currently-reproduced reproduction unit, changing the angle of the reproduced image data by using the angle change position information stored in the angle change position information storage step.

22. The image reproducing method according to claim 21, wherein the control step comprises a reproduction position information acquisition step of acquiring reproduction position information at the current reproduction time at the angle of change destination from the reproduction units represented by used angle change position information, and wherein in the control step, the angle of the reproduced image data based on the acquired reproduction position information is changed.

23. An image reproducing method of selectively reproducing and outputting image data of an arbitrary angle from image data of a plurality of angles including a plurality of reproduction units, comprising:

an angle position information determination step of determining whether or not angle change is available based on angle change position information representing an address of an angle change destination recorded in the reproduction units;

an angle change position information acquisition step of acquiring the angle change position information representing the address of the angle change destination recorded in the reproduction units excluding a currently-reproduced reproduction unit at a currently-reproduced angle; and a control step of, if in the angle position information determination step it is determined that the angle change cannot be performed by using the angle change position information recorded in the currently-reproduced reproduction unit, changing the angle of the reproduced image data by using the angle change position information acquired in the angle change position information acquisition step.

24. The method according to claim 23,
wherein the control step comprises a reproduction position information acquisition step of acquiring reproduction position information at the current reproduction time at the angle of change destination from the reproduction units represented by used angle change position information, and wherein in the control step, the angle of the reproduced image data based on the acquired reproduction position information is changed.

25. An image reproducing method of selectively reproducing and outputting image data of an arbitrary angle from image data of a plurality of angles including a plurality of reproduction units, comprising:

an angle position information determination step of determining whether or not angle change is available based on angle change position information representing an address of an angle change destination recorded in the reproduction units;

angle change position information storage step of storing the angle change position information representing an address of an angle change destination recorded in the reproduction units excluding a reproduced reproduction unit at an angle reproduced before switching to an angle menu, a control step of, when reproduction restoring is performed from the angle menu by using a menu resume function, if in the angle position information determination step it is determined that the angle change cannot be performed by using the angle change position information recorded in the currently-reproduced reproduction unit, changing the angle of the reproduced image data by using the angle change position information stored in the angle change position information storage step.

26. The method according to claim 25,
wherein the control step comprises a reproduction position information acquisition step of acquiring reproduction position information at the current reproduction time at the angle of change destination from the reproduction units represented by used angle change position information, and wherein in the control step, the angle of the reproduced image data based on the acquired reproduction position information is changed.

27. An image reproducing method of selectively reproducing and outputting image data of an arbitrary angle from image data of a plurality of angles including a plurality of reproduction units, comprising:

an angle position information determination step of determining whether or not angle change is available based on angle change position information representing an address of an angle change destination recorded in the reproduction units;

angle change position information acquisition step of acquiring the angle change position information representing an address of an angle change destination recorded in the reproduction units excluding a reproduced reproduction unit at an angle reproduced before switching to an angle menu, a control step of, when reproduction restoring is performed from the angle menu by using a menu resume function, if in the angle position information determination step it is determined that the angle change cannot be performed by using the angle change position information recorded in the currently-reproduced reproduction unit, changing the angle of the reproduced image data by using the angle change position information acquired in the angle change position information acquisition step.

28. The method according to claim 27,
wherein the control step comprises a reproduction position information acquisition step of acquiring reproduction position information at the current reproduction time at the angle of change destination from the reproduction units represented by used angle change position information, and wherein in the control step, the angle of the reproduced image data based on the acquired reproduction position information is changed.

29. The image reproducing method according to claim 21, 23, 25, or 27, wherein, if angle change position information representing an address of an angle change destination cannot be acquired or if the acquired address is 7FFFFFFFh, in the angle position information determination step, it is determined that the angle change cannot be performed.

30. The image reproducing method according to claim 21, wherein the reproduced image data and the angle change position information are data in accordance with a DVD-Video standard.

31. The image reproducing method according to claim 23, wherein the reproduced image data and the angle change position information are data in accordance with a DVD-Video standard.

32. The image reproducing method according to claim 25, wherein the reproduced image data and the angle change position information are data in accordance with a DVD-Video standard.

33. The image reproducing method according to claim 27, wherein the reproduced image data and the angle change position information are data in accordance with a DVD-Video standard.

* * * * *